(12) United States Patent
Kimura et al.

(10) Patent No.: US 10,298,844 B2
(45) Date of Patent: May 21, 2019

(54) IMAGE PROCESSING APPARATUS, METHOD FOR CONTROLLING THE SAME, AND IMAGE CAPTURING APPARATUS

(71) Applicant: CANON KABUSHIKI KAISHA, Tokyo (JP)

(72) Inventors: Masafumi Kimura, Kawasaki (JP); Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/946,059

(22) Filed: Apr. 5, 2018

(65) Prior Publication Data

US 2018/0227493 A1 Aug. 9, 2018

Related U.S. Application Data

(63) Continuation of application No. 15/175,849, filed on Jun. 7, 2016, now Pat. No. 9,967,462.

(30) Foreign Application Priority Data

Jun. 8, 2015 (JP) .................................. 2015-116022
Jun. 8, 2015 (JP) .................................. 2015-116024

(51) Int. Cl.
*H04N 5/232* (2006.01)
*H04N 5/238* (2006.01)
*H04N 5/235* (2006.01)

(52) U.S. Cl.
CPC ......... *H04N 5/23254* (2013.01); *H04N 5/238* (2013.01); *H04N 5/2327* (2013.01);
(Continued)

(58) Field of Classification Search
CPC .. H04N 5/23251–5/23287; G06T 7/20–7/292;
(Continued)

(56) References Cited

U.S. PATENT DOCUMENTS

2013/0141599 A1* 6/2013 Kimura .................. H04N 5/225
348/207.99

FOREIGN PATENT DOCUMENTS

JP 11-194377 A 7/1999
JP 2010-041245 A 2/2010
JP 2013-118450 A 6/2013

OTHER PUBLICATIONS

"Digital Image Processing," Computer Graphic Arts Society, pp. 243-245.

* cited by examiner

*Primary Examiner* — Paul M Berardesca
(74) *Attorney, Agent, or Firm* — Cowan, Liebowitz & Latman, P.C.

(57) ABSTRACT

An image processing apparatus detects predetermined information from an image signal and output a detection signal indicating the detected information, stores the detection signals for a plurality of periods, calculates a first prediction value based on a predetermined number of detection signals, from a newer one to older ones excluding a latest detection signal, stored in the storage unit, calculates a coefficient based on a difference between the first prediction value and a value of the latest detection signal, calculates a second prediction value based on the coefficient and the predetermined number of detection signals, from the latest one to older ones, and generates, based on the second prediction value, a control signal for controlling a predetermined constituent member.

6 Claims, 21 Drawing Sheets

(52) U.S. Cl.
CPC ......... *H04N 5/2328* (2013.01); *H04N 5/2353* (2013.01); *H04N 5/23212* (2013.01)

(58) Field of Classification Search
CPC ........... G06T 2207/20004–2207/20012; G02B 27/646; G03B 5/02; G03B 2205/0007–2205/0038
See application file for complete search history.

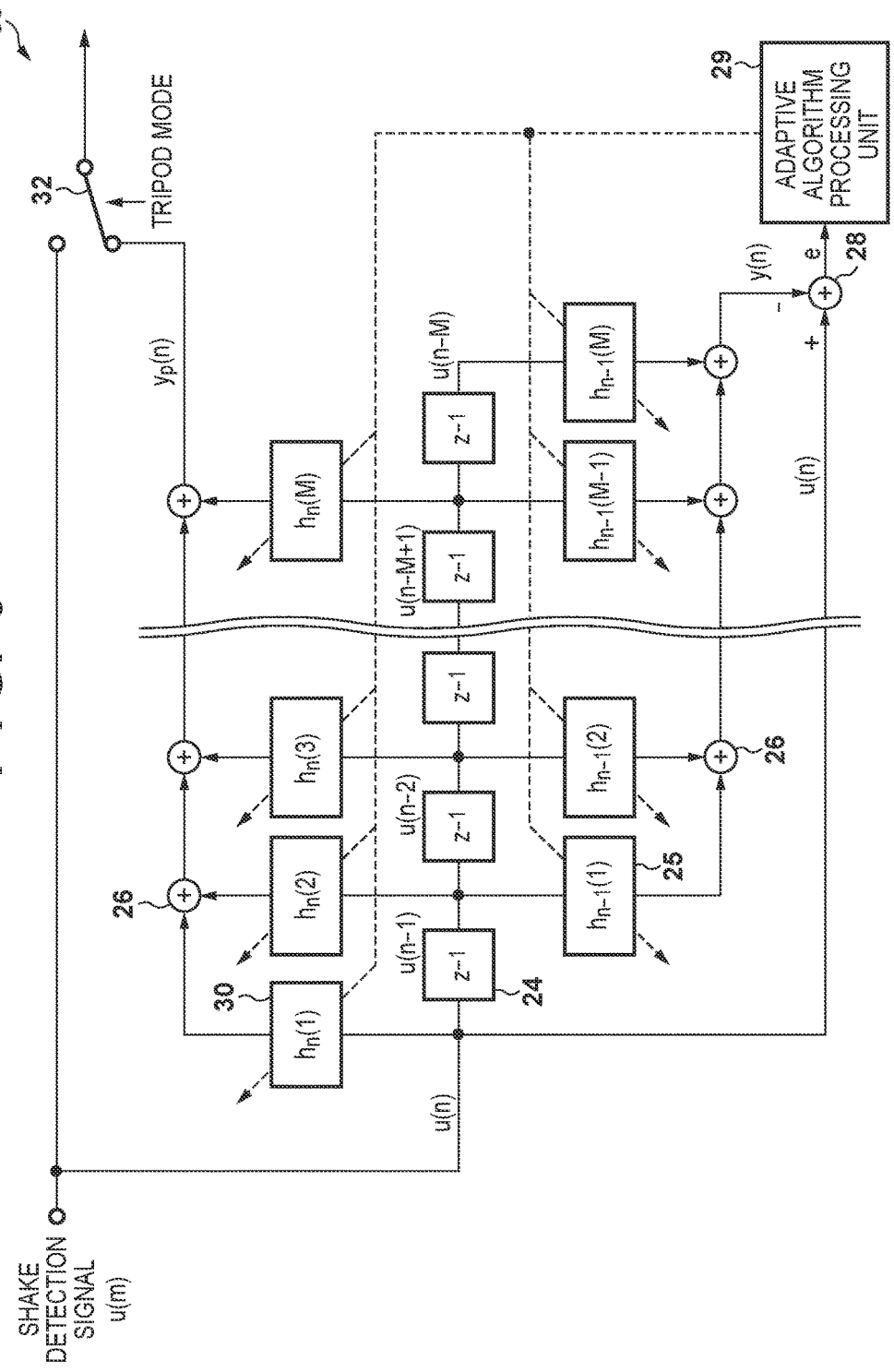

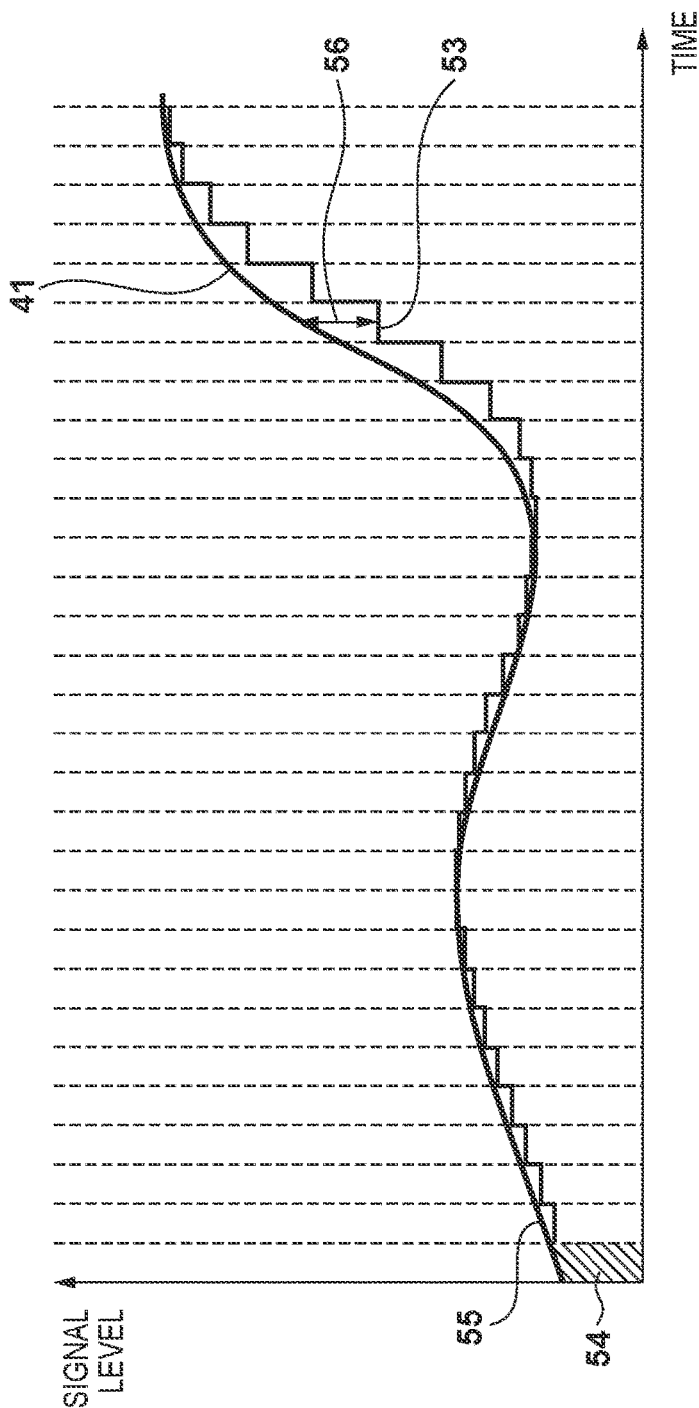

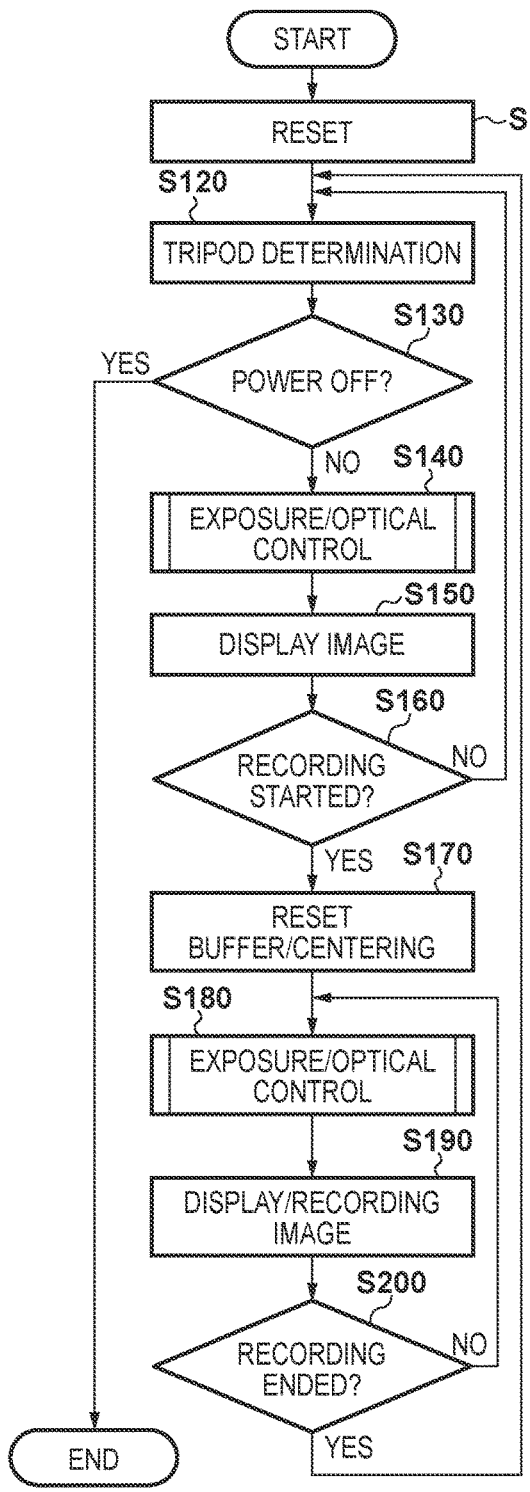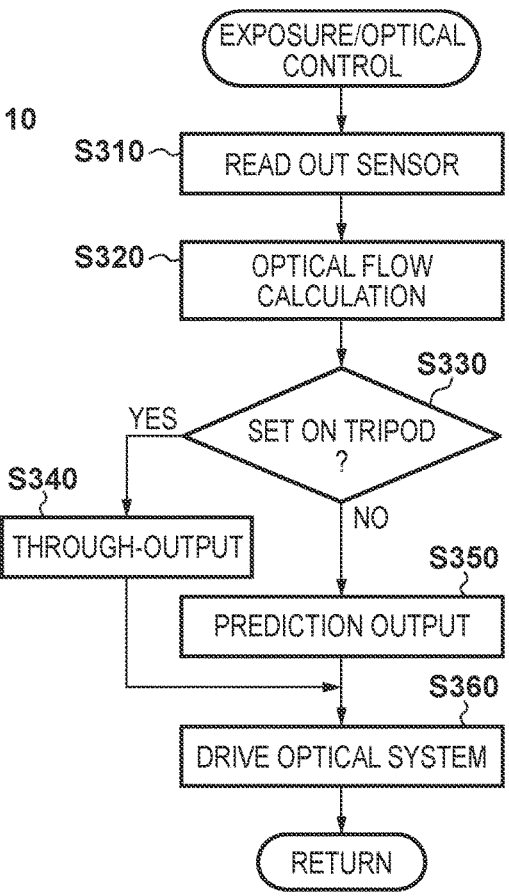

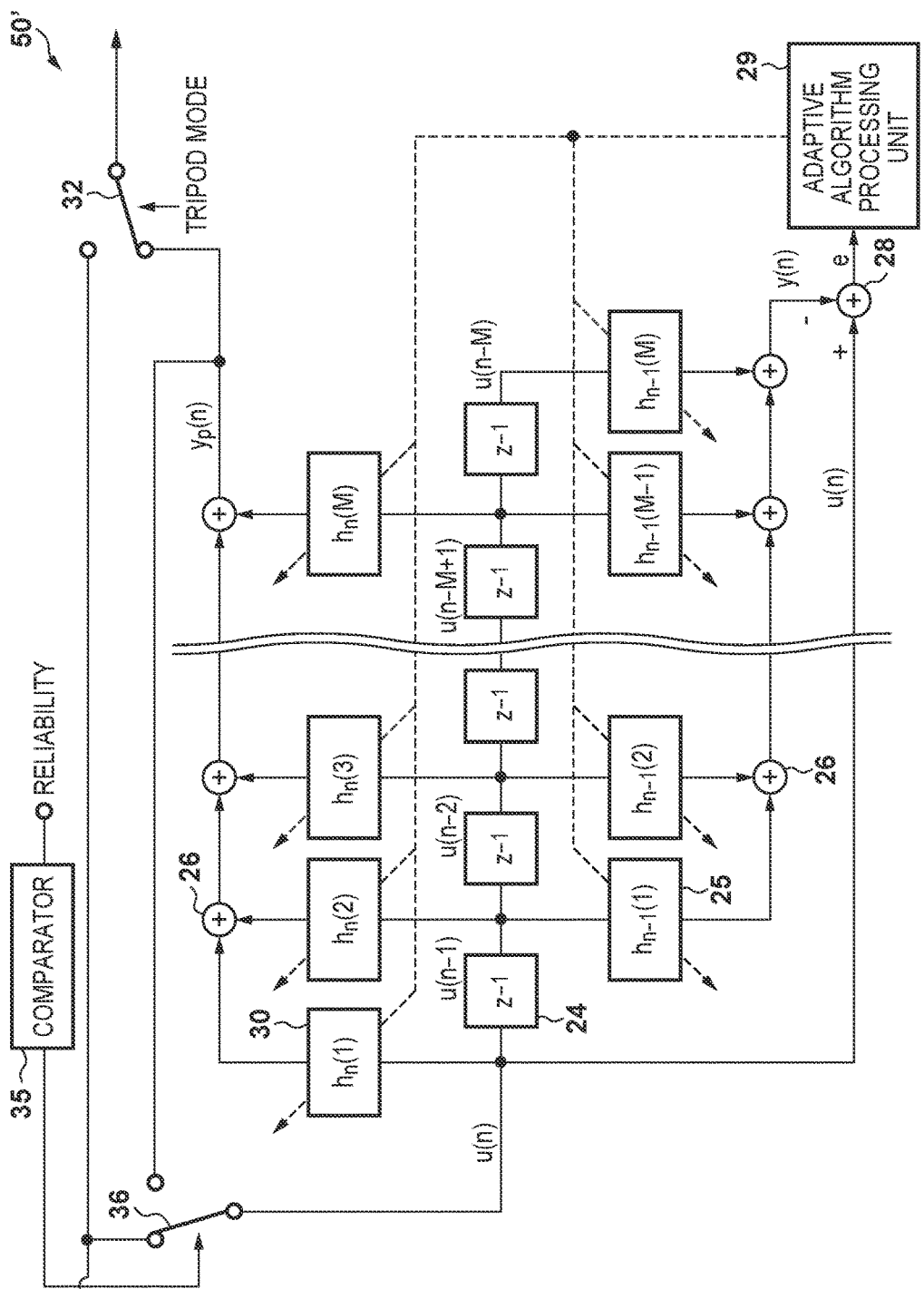

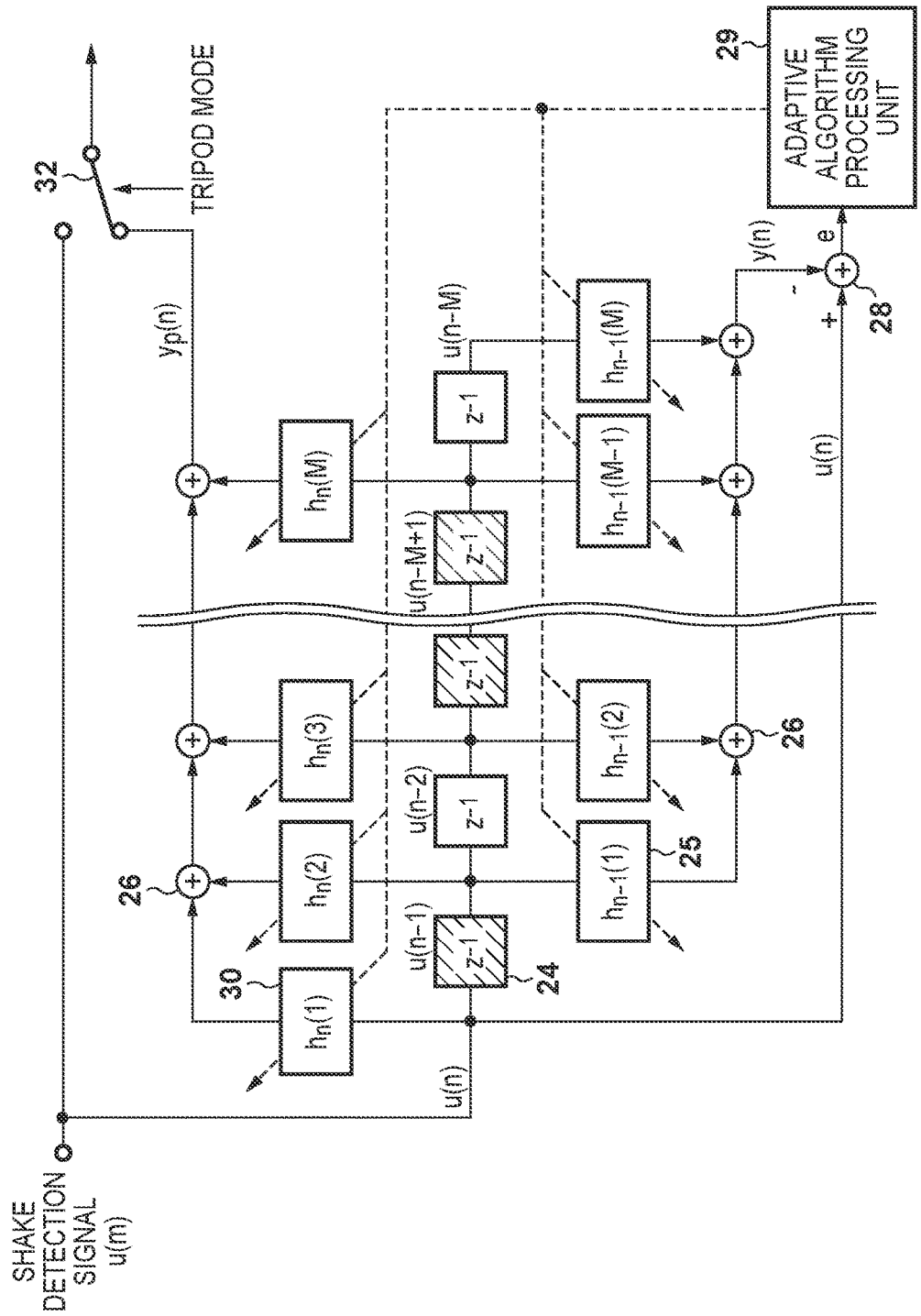
F I G. 10A

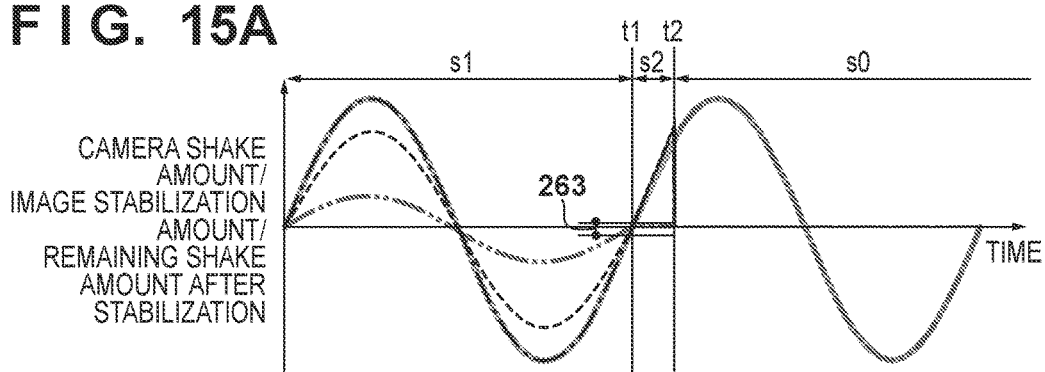
F I G. 15A
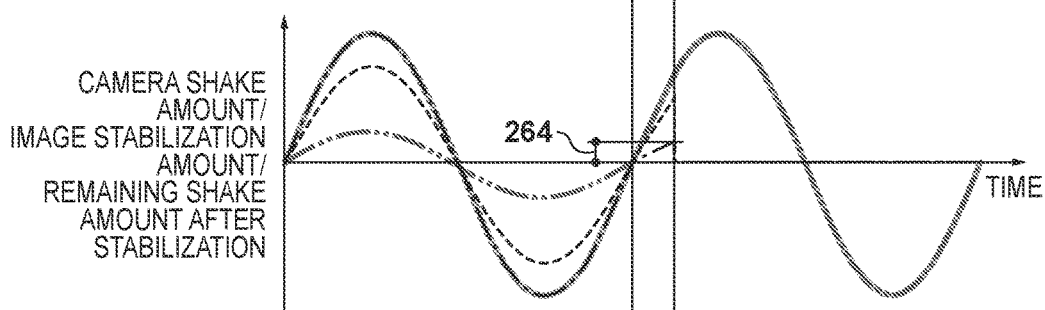
F I G. 15B
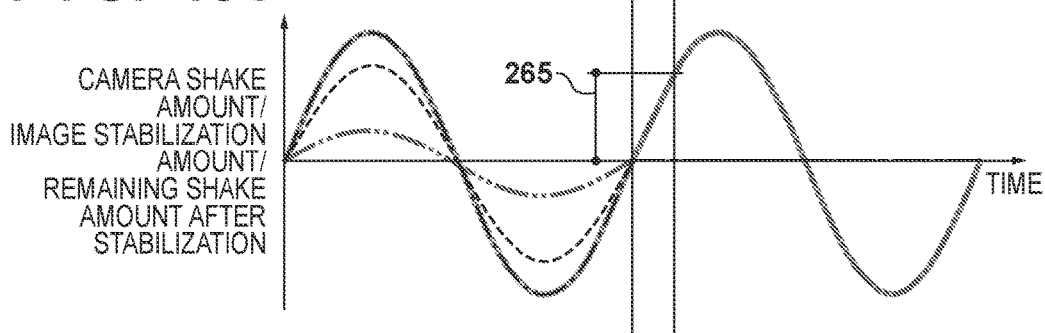
F I G. 15C
──────── ACTUAL CAMERA SHAKE AMOUNT
── ─ ── DETECTED CAMERA SHAKE AMOUNT
─ ─ ─ ─ ─ IMAGE STABILIZATION AMOUNT
── ·· ── REMAINING SHAKE AMOUNT AFTER STABILIZATION FIG. 16A
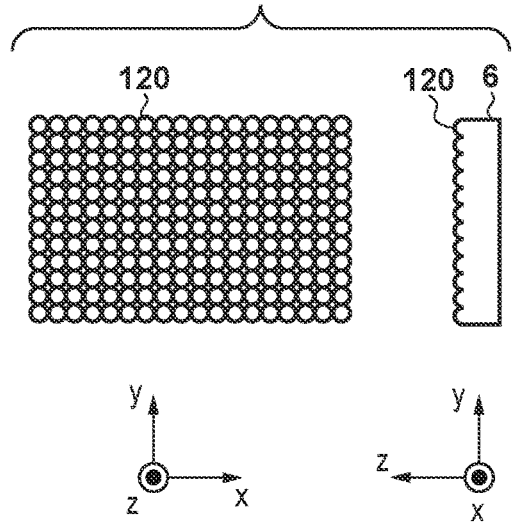
FIG. 16C
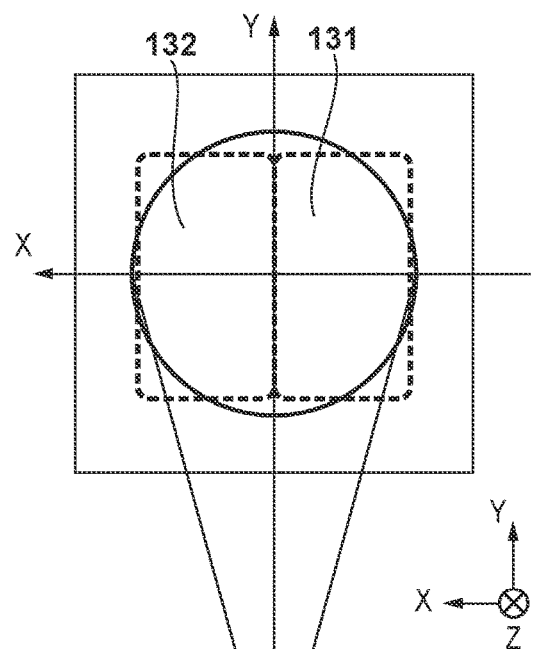
FIG. 16B
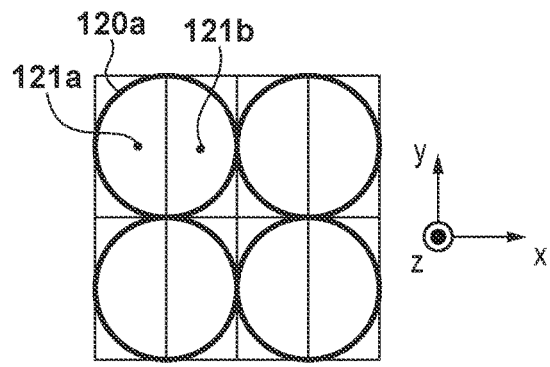
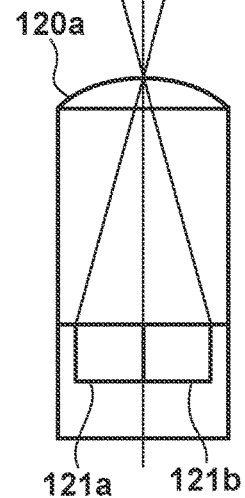

——— ACTUAL CAMERA SHAKE AMOUNT
—·— DETECTED CAMERA SHAKE AMOUNT
------ IMAGE STABILIZATION AMOUNT
········ REMAINING SHAKE AMOUNT AFTER STABILIZATION

IMAGE PROCESSING APPARATUS, METHOD FOR CONTROLLING THE SAME, AND IMAGE CAPTURING APPARATUS

CROSS-REFERENCE TO RELATED APPLICATION

This application is a continuation of application Ser. No. 15/175,849, filed Jun. 7, 2016, the entire disclosure of which is hereby incorporated by reference.

BACKGROUND OF THE INVENTION

Field of the Invention

The present invention relates to image processing apparatuses, methods for controlling the image processing apparatuses, and image capturing apparatuses, and relates more specifically to an image processing apparatus that performs control based on a signal obtained from an image sensor provided in an image capturing apparatus, a method for controlling the image processing apparatus, and an image capturing apparatus.

Description of the Related Art

Recently, image sensors have become more and more functional, and improvement in the number of pixels and the frame rate and the like has been achieved. Also, a method for obtaining vector data (optical flow), which indicates movement of an object between a plurality of images, using a signal obtained from an image sensor is known. Moreover, a technique for combining a plurality of images and detecting a moving object based on the optical flow is known. Note that, as a method for obtaining the optical flow, the method disclosed in "Digital Image Processing", Computer Graphic Arts Society, pp. 243 to 245 is available.

Meanwhile, time-series signal prediction through signal processing and a control method based on prediction have also been proposed. Japanese Patent Laid-Open No. 2013-118450 discloses a signal processing method with which a signal at the time of occurrence of an abnormal value is generated by a prediction device in a system where the abnormal value occurs for a certain time period in an observation signal.

Japanese Patent Laid-Open No. 11-194377 proposes a system for performing image stabilization by locally performing linear approximation based on a value obtained by camera shake detection. Japanese Patent Laid-Open No. 2010-41245 discloses a method for detecting a shake in a focusing direction, and predicting and controlling a shake that is to occur from when an exposure start instruction is given until exposure is started.

However, with Japanese Patent Laid-Open No. 2013-118450, which relates to a technique for predicting a future signal from a current observation signal, a delay that has already occurred in a current observation signal cannot be compensated.

In Japanese Patent Laid-Open No. 11-194377 and Japanese Patent Laid-Open No. 2010-41245, it is assumed that a so-called camera shake is detected using some kind of sensor, but a signal obtained after performing image stabilization is not observed. Since a signal from an image sensor is suitable for detection of the status of an optical system, in the case of adjusting the optical system before exposure, use of the signal from the image sensor enables only the remaining shake after the stabilization to be observed. However, the methods described in Japanese Patent Laid-Open No. 11-194377 and Japanese Patent Laid-Open No. 2010-41245 cannot be applied to this kind of system.

SUMMARY OF THE INVENTION

The present invention has been made in consideration of the above situation, and reduces the influence of a delay in adjustment of an optical system performed based on a signal that is output from an image sensor.

Furthermore, in a system for adjusting a constituent member of a camera system using a signal of an image sensor, the present invention appropriately adjusts the constituent member even if the signal of the image sensor cannot be obtained.

According to the present invention, provided is an image processing apparatus comprising: a detection unit configured to detect predetermined information from an image signal that is output from an image sensor at a predetermined period, and output a detection signal indicating the detected information; a storage unit configured to store the detection signals for a plurality of periods, from a newer one to older ones; a first calculation unit configured to calculate a first prediction value based on a predetermined number of detection signals, from a newer one to older ones excluding a latest detection signal, among the detection signals for the plurality of periods stored in the storage unit; a computing unit configured to calculate a coefficient for obtaining a second prediction value based on a difference between the first prediction value and a value of the latest detection signal; a second calculation unit configured to calculate the second prediction value based on the coefficient and the predetermined number of detection signals, from the latest one to older ones, among the detection signals for the plurality of periods stored in the storage unit; and a generation unit configured to generate, based on the second prediction value, a control signal for controlling a predetermined constituent member that is used for obtaining the image signal.

Further, according to the present invention, provided is an image capturing apparatus comprising: an image sensor; and an image processing apparatus that comprises: a detection unit configured to detect predetermined information from an image signal that is output from the image sensor at a predetermined period, and output a detection signal indicating the detected information; a storage unit configured to store the detection signals for a plurality of periods, from a newer one to older ones; a first calculation unit configured to calculate a first prediction value based on a predetermined number of detection signals, from a newer one to older ones excluding a latest detection signal, among the detection signals for the plurality of periods stored in the storage unit; a computing unit configured to calculate a coefficient for obtaining a second prediction value based on a difference between the first prediction value and a value of the latest detection signal; a second calculation unit configured to calculate the second prediction value based on the coefficient and the predetermined number of detection signals, from the latest one to older ones, among the detection signals for the plurality of periods stored in the storage unit; and a generation unit configured to generate, based on the second prediction value, a control signal for controlling a predetermined constituent member that is used for obtaining the image signal.

Furthermore, according to the present invention, provided is a method for controlling an image processing apparatus, the method comprising: detecting predetermined information from an image signal that is output from an image sensor at a predetermined period, and outputting a detection signal indicating the detected information; storing, in a storage unit, the detection signals output in the detecting for a plurality of periods, from a newer one to older ones; calculating a first prediction value based on a predetermined number of detection signals, from a newer one to older ones excluding a latest detection signal, among the detection signals for the plurality of periods stored in the storage unit; calculating a coefficient for obtaining a second prediction value based on a difference between the first prediction value and a value of the latest detection signal; calculating the second prediction value based on the coefficient and the predetermined number of detection signals from the latest one to older ones, among the detection signals for the plurality of periods stored in the storage unit; and generating, based on the second prediction value, a control signal for controlling a predetermined constituent member that is used for obtaining the image signal.

Further, according to the present invention, provided is a non-transitory computer-readable storage medium storing a program for causing a computer to execute the steps of the control method comprising: detecting predetermined information from an image signal that is output from an image sensor at a predetermined period, and outputting a detection signal indicating the detected information; storing, in a storage unit, the detection signals output in the detecting for a plurality of periods, from a newer one to older ones; calculating a first prediction value based on a predetermined number of detection signals, from a newer one to older ones excluding a latest detection signal, among the detection signals for the plurality of periods stored in the storage unit; calculating a coefficient for obtaining a second prediction value based on a difference between the first prediction value and a value of the latest detection signal; calculating the second prediction value based on the coefficient and the predetermined number of detection signals from the latest one to older ones, among the detection signals for the plurality of periods stored in the storage unit; and generating, based on the second prediction value, a control signal for controlling a predetermined constituent member that is used for obtaining the image signal.

Further, according to the present invention, provided is an image processing apparatus comprising: a detection unit configured to detect predetermined information from an image signal that is output from an image sensor at a predetermined period, and output a detection signal indicating the detected information; a sensor configured to detect a position signal indicating a position of a predetermined constituent member, driven based on the detected information, for obtaining the image signal; and a generation unit configured to generate a control signal for controlling the constituent member based on a combined signal obtained by combining the position signal and the detection signal.

Further, according to the present invention, provided is an image processing apparatus comprising: a detection unit configured to detect predetermined information from an image signal that is output from an image sensor at a predetermined period, and output a detection signal indicating the detected information; a storage unit configured to store the detection signals for a plurality of periods, from a newer one to older ones; a prediction unit configured to predict a detection signal that is to be obtained in a next period based on the detection signals stored in the storage unit; and a generation unit configured to generate a control signal for controlling a predetermined constituent member for obtaining the image signal based on a latest detection signal if the predetermined information is detected by the detection unit, and generate the control signal based on the detection signal predicted by the prediction unit if the predetermined information is not detected.

Further, according to the present invention, provided is an image capturing apparatus comprising: an image sensor; and an image processing apparatus that comprises: a detection unit configured to detect predetermined information from an image signal that is output from the image sensor at a predetermined period, and output a detection signal indicating the detected information; a sensor configured to detect a position signal indicating a position of a predetermined constituent member, driven based on the detected information, for obtaining the image signal; and a generation unit configured to generate a control signal for controlling the constituent member based on a combined signal obtained by combining the position signal and the detection signal.

Further, according to the present invention, provided is an image capturing apparatus comprising: an image sensor; and an image processing apparatus that comprises: a detection unit configured to detect predetermined information from an image signal that is output from an image sensor at a predetermined period, and output a detection signal indicating the detected information; a storage unit configured to store the detection signals for a plurality of periods, from a newer one to older ones; a prediction unit configured to predict a detection signal that is to be obtained in a next period based on the detection signals stored in the storage unit; and a generation unit configured to generate a control signal for controlling a predetermined constituent member for obtaining the image signal based on a latest detection signal if the predetermined information is detected by the detection unit, and generate the control signal based on the detection signal predicted by the prediction unit if the predetermined information is not detected.

Further, according to the present invention, provided is a method for controlling an image processing apparatus, the method comprising: detecting predetermined information from an image signal that is output from an image sensor at a predetermined period, and outputting a detection signal indicating the detected information; detecting a position signal indicating a position of a predetermined constituent member, driven based on the detected information, for obtaining the image signal; and generating a control signal for controlling the constituent member based on a combined signal obtained by combining the position signal and the detection signal.

Further, according to the present invention, provided is a method for controlling an image processing apparatus, the method comprising: detecting predetermined information from an image signal that is output from an image sensor at a predetermined period, and outputting a detection signal indicating the detected information; storing, in a storage unit, the detection signals for a plurality of periods, from a newer one to older ones; predicting a detection signal that is to be obtained in a next period based on the detection signals stored in the storage unit; and generating a control signal for controlling a predetermined constituent member for obtaining the image signal based on a latest detection signal if the predetermined information is detected by the detection unit, and generating the control signal based on the predicted detection signal if the predetermined information is not detected.

Further, according to the present invention, provided is a non-transitory computer-readable storage medium storing a program for causing a computer to execute the steps of the control method comprising: detecting predetermined information from an image signal that is output from an image sensor at a predetermined period, and outputting a detection signal indicating the detected information; detecting a position signal indicating a position of a predetermined constituent member, driven based on the detected information, for obtaining the image signal; and generating a control signal for controlling the constituent member based on a combined signal obtained by combining the position signal and the detection signal.

Further, according to the present invention, provided is a non-transitory computer-readable storage medium storing a program for causing a computer to execute the steps of the control method comprising: detecting predetermined information from an image signal that is output from an image sensor at a predetermined period, and outputting a detection signal indicating the detected information; storing, in a storage unit, the detection signals for a plurality of periods, from a newer one to older ones; predicting a detection signal that is to be obtained in a next period based on the detection signals stored in the storage unit; and generating a control signal for controlling a predetermined constituent member for obtaining the image signal based on a latest detection signal if the predetermined information is detected by the detection unit, and generating the control signal based on the predicted detection signal if the predetermined information is not detected.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram showing a configuration of a prediction signal generation unit according to a first embodiment;

FIGS. 4A and 4B are diagrams illustrating a sampling delay and specific operations of the prediction signal generation unit according to the present embodiment;

FIGS. 5A and 5B are flowcharts showing operations of a camera system according to the present embodiment;

FIG. 7 is a block diagram showing a configuration of a prediction signal generation unit according to a second embodiment;

FIGS. 10A and 10B are block diagrams showing a configuration of a prediction signal generation unit according to a fourth embodiment;

FIGS. 15A to 15C are diagrams illustrating a remaining shake amount after stabilization at the time of still image shooting according to the fifth embodiment;

FIGS. 16A to 16C are diagrams showing a configuration of an image sensor according to a sixth embodiment;

DESCRIPTION OF THE EMBODIMENTS

Exemplary embodiments of the present invention will be described in detail in accordance with the accompanying drawings.

First Embodiment

Figure 1:
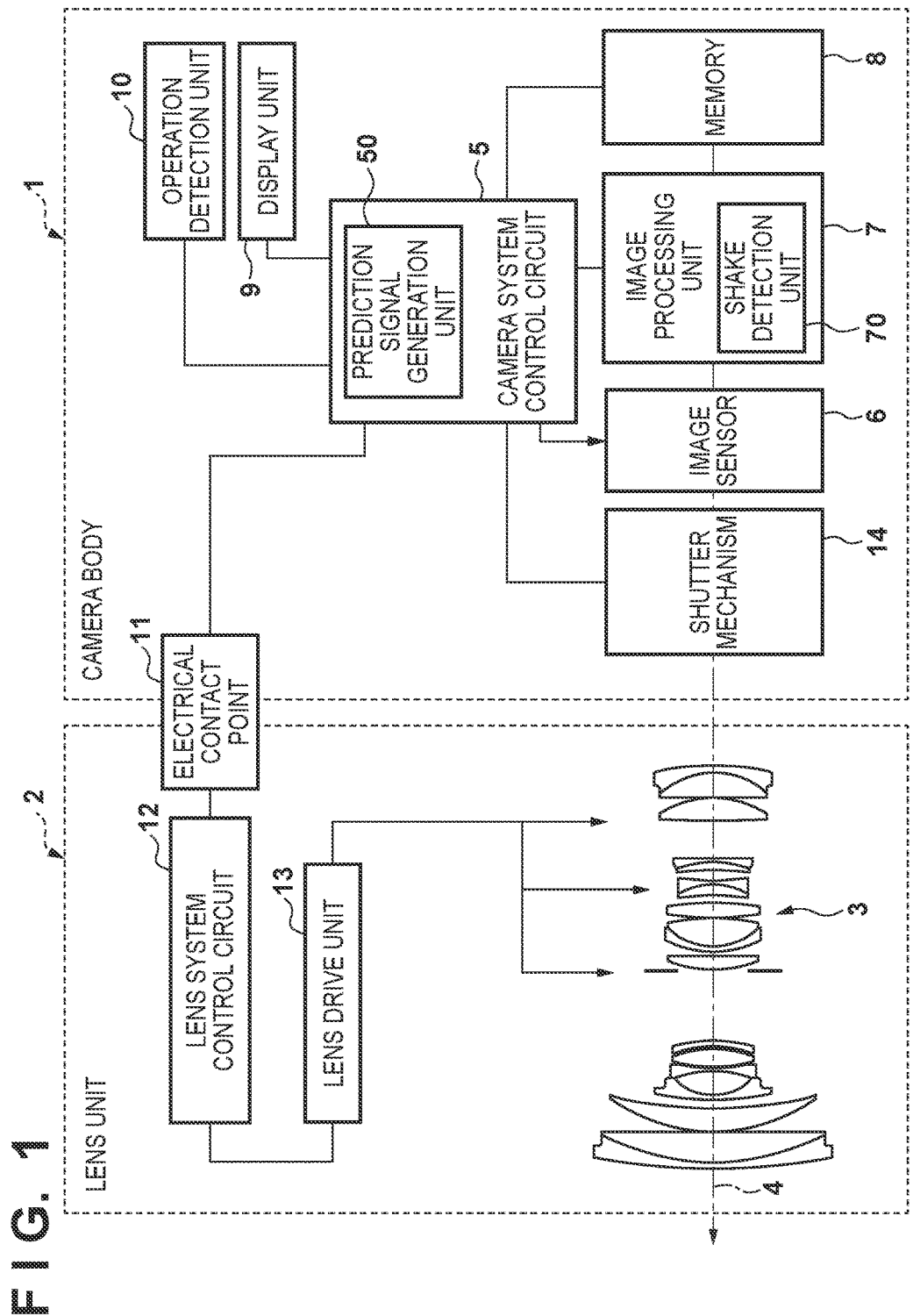
FIG. 1 is a block diagram showing an image capturing apparatus according to a first embodiment of the present invention.

FIG. 1 is a block diagram showing a schematic configuration of a camera system. The camera system according to a first embodiment is constituted mainly by a camera body 1 and a lens unit 2 that can be attached to and detached from the camera body 1. The camera body 1 and the lens unit 2 are electrically connected to each other via an electrical contact point 11.

The lens unit 2 includes an imaging optical system 3, which is constituted by a diaphragm and a plurality of lenses including a focus lens and a image stabilization lens that are arranged on an optical axis 4, a lens system control circuit 12, and a lens drive unit 13.

Light coming from an object that enters via the imaging optical system 3 forms an image on an imaging plane of an image sensor 6 via a shutter mechanism 14. The image sensor 6 performs photoelectric conversion on the incident light, and outputs an electric signal (image signal) that corresponds to a quantity of light.

An image processing unit 7 includes an A/D convertor, a white balance adjustment circuit, a gamma correction circuit, an interpolation calculation circuit, a color interpolation processing circuit, and the like, and can perform given image interpolation processing and color conversion processing and generate image data for recording and image data for display. The image processing unit 7 also compresses image data and audio data using a predetermined method. Furthermore, the image processing unit 7 performs given calculation processing using A/D-converted image data, and a camera system control circuit 5 can perform, based on the obtained calculation result, TTL (through-the-lens) autofocusing (AF) processing and auto-exposure (AE) processing. The camera system control circuit 5 thereby obtains the amount of driving of the focus lens included in the imaging optical system 3, the f-number of the diaphragm, and the exposure period of the shutter mechanism 14. The camera system control circuit 5 then notifies the lens system control circuit 12 of the amount of driving of the focus lens and the f-number of the diaphragm via the electrical contact point 11. The lens system control circuit 12 controls the lens drive unit 13 based on the amount of driving of the focus lens and the f-number of the diaphragm of which the lens system control circuit 12 is notified, and drives the focus lens and the diaphragm. The camera system control circuit 5 also controls the shutter mechanism 14 based on the obtained exposure period.

The image processing unit 7 also includes a shake detection unit 70 that compares a plurality of images based on image signals obtained from the image sensor 6 and generates a shake detection signal. Note that processing in the shake detection unit 70 will be described later in detail.

The image data for recording generated by the image processing unit 7 is output to a memory 8 by the camera system control circuit 5. On the other hand, the image data for display is displayed on the display unit 9 by the camera system control circuit 5. An electronic view finder (EVF) function can also be achieved by sequentially displaying captured image data using the display unit 9. Note that the display unit 9 can arbitrarily turn on and off the display in accordance with an instruction from the camera system control circuit 5, and if the display is turned off, power consumption of the camera body 1 can be significantly reduced.

The camera system control circuit 5 includes a temporary storage area and a calculation unit, and controls the overall camera system. In addition to the aforementioned control, the camera system control circuit 5 generates and outputs a timing signal when shooting an image, and controls an imaging system, an image processing system, and a recording/reproduction system in accordance with a user operation made from the outside. For example, upon an operation detection unit 10 detecting that a shutter release button (not shown) has been pressed, the camera system control circuit 5 controls the driving of the image sensor 6, image signal processing and compression processing in the image processing unit 7, recording processing, display content or the like of information that is displayed on the display unit 9, and the like. The display unit 9 is a touch panel and is connected to the operation detection unit 10.

The camera system control circuit 5 includes a prediction signal generation unit 50 that predicts a shake based on the shake detection signal obtained from the shake detection unit 70 and outputs a shake prediction signal that indicates the predicted shake. Then, the camera system control circuit 5 controls the image stabilization lens via the lens drive unit 13 based on the shake prediction signal indicating the predicted shake.

Figure 2A:
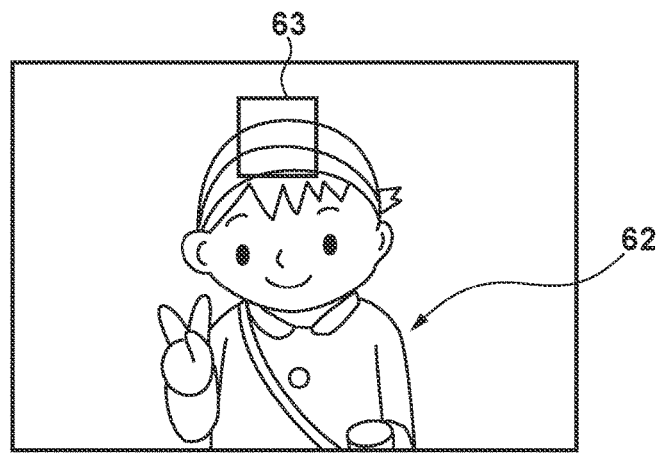
FIGS. 2A to 2C are diagrams illustrating a method for calculating an optical flow.
Figure 2B:
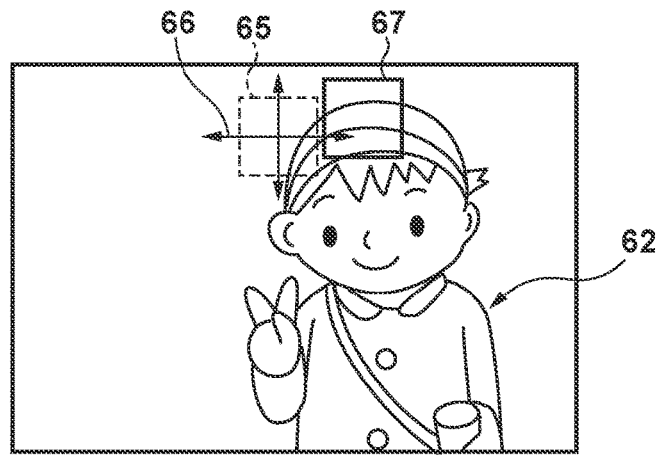
Figure 2C:
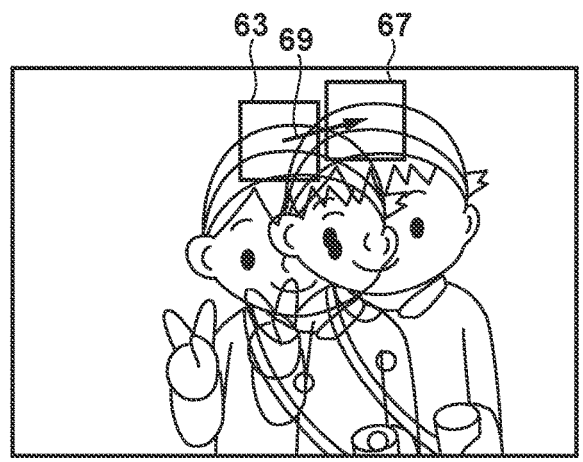

FIGS. 2A to 2C are diagrams illustrating an exemplary method for obtaining an optical flow, which is a shake detection signal that is based on the comparison between a plurality of images performed by the shake detection unit 70. Although a so-called block matching method will be described in FIGS. 2A to 2C, other methods may alternatively be used. In the present embodiment, it is assumed that the shake detection signal is obtained when displaying a live view and when shooting a moving image, and image signals that are accumulated and read out from the image sensor 6 at a predetermined period are used.

Assuming that the latest time of reading out an image signal from the image sensor 6 is $t_n$, FIG. 2A shows an image that is read out at time $t_{n-1}$ in the previous period, and FIG. 2B shows an image that is read out at the time $t_n$. FIG. 2C is a diagram in which the images that are read out at the time $t_{n-1}$ and the time $t_n$ are overlapped with each other, and schematically shows a detected vector (shake detection signal).

First, in the image that is read out at the time $t_{n-1}$ shown in FIG. 2A, attention will be paid to a region 63 in the region of the object 62. The size of this region 63 can be arbitrarily set, and may be, for example, 8×8 pixels. The location in the image obtained at the time $t_n$ shown in FIG. 2B to which the region 63 has moved is searched for, with a differential absolute value or the like as a reference. Specifically, in the image in FIG. 2B, a differential absolute value is calculated while shifting the region as indicated by arrows 66 within a predetermined area, with a region 65 whose position corresponds to the region 63 as the center. In the case of using the differential absolute value as a reference, the position at which the value is smallest is a region 67 that corresponds to the region 63. As a result, as shown in FIG. 2C, it can be understood that the region 63 shown in FIG. 2A has moved between the two images as indicated by a vector 69.

The above operation is performed for a plurality of regions that are set in the screen, and a plurality of moving vectors are detected. Thereafter, one evaluation value of the moving vectors between the two images is determined using a method such as selecting a vector while paying attention to a main object or obtaining an estimated value with a RANSAC (Random Sample Consensus) method or the like. Note that the RANSAC is a known technique and is not essential part of the invention of this application, and a description thereof will therefore be omitted. The shake detection unit 70 thus obtains and outputs the shake detection signal.

FIG. 3 is a block diagram showing an exemplary configuration of the prediction signal generation unit 50 included in the camera system control circuit 5 according to the first embodiment. In the first embodiment, the shake prediction signal is generated when displaying a live view and when shooting a moving image. The image signals that are periodically read out from the image sensor 6 are compared by the shake detection unit 70 in the image processing unit 7, and a shake detection signal u(m) is output and is then input to the prediction signal generation unit 50. Note that m in the bracket indicates an $m^{th}$ sampling timing.

The input shake detection signal u(m) is delayed by one period by a plurality of delay units $24(z^{-1})$ that are connected in series. Assuming that the latest read image signal is an $n^{th}$ sample, the shake detection signal obtained by delaying the shake detection signal u(n) by one period is a shake detection signal u(n−1), which indicates a shake detection signal that is based on an image signal sampled in the n−1$^{th}$ sampling period. Thereafter, similarly, the shake detection signals u(n−2) u(n−M+1), and u(n−M) are defined. These shake detection signals u(n), u(n−1), . . . , u(n−M+1), and u(n−M) for a plurality of periods are accumulated in a buffer memory (not shown) in the camera system control circuit 5. Efficient buffering can be achieved by forming the buffer memory using, for example, a ring buffer, and replacing data at a current writing position and changing the writing position every time a new shake detection signal u(n) is input. Then, by the calculation denoted by Equation (1), filter coefficients 25 and the buffered shake detection signals are subjected to convolution integration by a series of adders 26. Thereby, a prediction value y(n) of the latest shake detection signal u(n) is obtained from a predetermined number of shake detection signals u(m) up to a shake detection signal u(n−1) at the previous sampling timing among the shake detection signals u(m) for a plurality of periods accumulated in the buffer memory. Note that $h_{n-1}$ indicates the filter coefficients 25 that have been obtained until the n−1$^{th}$ sampling timing.

$$y(n) = \sum_{m=1}^{M} h_{n-1}(m)u(n-m) \quad (1)$$

Equation (1) indicates that time-series prediction is performed by means of linear combination. It is known that a smooth signal and highly repeatable signal can be well approximated by Equation (1). Many signals for controlling the imaging optical system 3 have these characteristics.

An error e at this time can be defined by the next Equation (2). This error e can be obtained by subtracting the prediction value y(n) obtained by the series of adders 26 from the latest shake detection signal u(n) using an adder 28.

$$e = u(n) - y(n) \quad (2)$$

With this definition, a filter for adaptively predicting the next period using a known adaptive algorithm in an adaptive algorithm processing unit 29 is formed. As an exemplary adaptive algorithm, an equation for updating the filter coefficients using an LMS algorithm is expressed by Equation (3). Equation (3) is an exemplary adaptive algorithm, whereas other algorithms such as NLMS and RLS may alternatively be used.

$$h_n(i) = h_{n-1}(i) + \mu e u(i) \quad (3)$$

(i=1, 2, . . . , M)

Note that μ in Equation (3) above indicates a step size parameter. A filter is adaptively formed by repeating the calculation of Equations (1) to (3) for every sampling period and updating h.

With the filter coefficients 30 that are updated as above, a shake prediction signal $y_p(n)$ is obtained by performing convolution integration on the shake detection signal u(m) using the series of adders 26 using the calculation denoted by Equation (4) below.

$$y_p(n) = \sum_{m=1}^{M} h_n(m)u(n-m+1) \quad (4)$$

In Equation (4) above, the shake prediction signal $y_p(n)$ is a signal of the next sampling timing that is predicted from a predetermined number of shake detection signals u(m) obtained until now among the shake detection signals u(m) for the plurality of periods accumulated in the buffer memory. Equation (4) and Equation (1), which are similar to each other, are different in the following points. First, filter coefficients $h_n$ that have been updated by Equation (3) are used. Furthermore, the oldest shake detection signal to be used in the calculation is not the shake detection signal u(n−M) but u(n−M+1), and the current shake detection signal u(n) is used. As a result, Equation (4) is an equation for calculating a shake prediction signal $y_p(n)$ of the next sampling period predicted from the signals that have been sampled until now. The prediction signal $y_p(n)$ at the next sampling timing predicted from the latest shake detection signal u(n) is a current estimated value from which an accumulation delay has been eliminated, which will be described later using FIGS. 4A and 4B.

Note that in the above description, the calculation of Equations (1) to (4) is individually performed while paying attention to a certain sampling timing. However, Equation (4) is an equation obtained by replacing n in Equation (1) with n+1. That is to say, the shake prediction signal $y_p(n)$ can be used as y(n+1) in the next sampling. For this reason, the amount of calculation can be reduced by storing the shake prediction signal $y_p(n)$ in the memory. At the next sampling time, the calculation may be immediately performed in the order of Equation (2), Equation (3), and Equation (4) while changing the shake prediction signal $y_p(n)$ to y(n+1). Note that, at the first sampling time, the calculation may be started from Equation (1).

A switch 32 is switched in accordance with later-described tripod determination, and in the case where a shake is small, such as when shooting is performed using a tripod, the switch 32 is controlled so as to output the shake detection signal u(n) as-is, and in other cases, the switch 32 is controlled so as to output the shake prediction signal $y_p(n)$. The output of the switch 32 is used in the control of the imaging optical system 3.

Note that although, in FIG. 3, the switch 32 is switched to output the shake detection signal u(n) when outputting the shake detection signal u(n) as-is in order to facilitate understanding, the same output can be obtained by setting the filter coefficients $h_n(1)=1$, $h_n(i)=0$ (i=2, 3, . . . , M). In this case, in the case of outputting the shake detection signal u(n) as-is as well, the output is generated based on the shake detection signals u(n−1) to u(n−M+1) that are stored in the buffer memory. The processing at this time corresponds to processing in the case where the current observation value is a good prediction value.

Next, a description will be given of a delay due to accumulation, a state of generation of the shake prediction signals, and a difference in occurrence of an error due to a difference in the sampling period, with reference to FIGS. 4A and 4B.

Figure 4A:
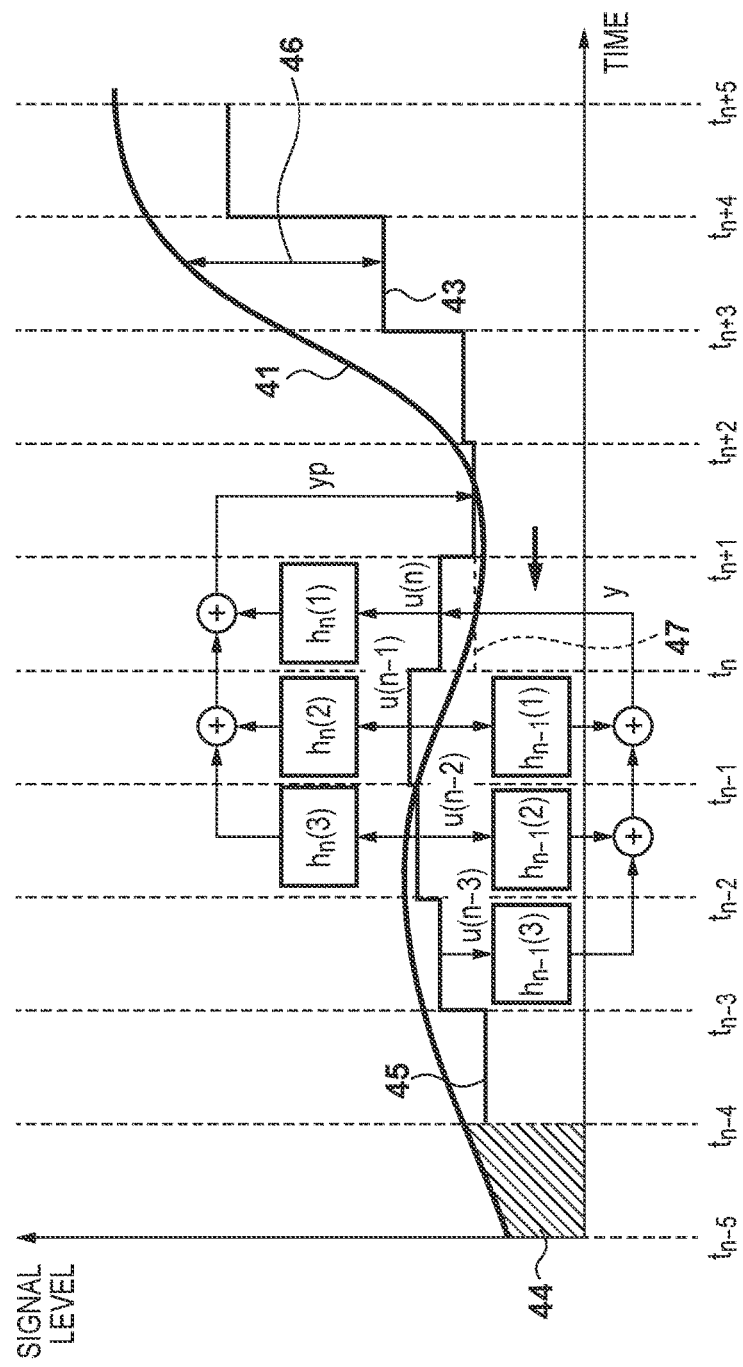

FIG. 4A is a diagram illustrating an accumulation delay at the time of a certain sampling period, and signal processing according to the first embodiment. In FIG. 4A, the horizontal axis and the vertical axis respectively indicate the time and the signal level of the shake detection signal u(m). A curve 41 indicates an actual shake of the camera system.

In the case where a shake changes as indicated by the curve 41, in the system according to the present embodiment, the shake detection unit 70 calculates the shake detection signal u(m) from image signals obtained by accumulating charges for a predetermined time in the image sensor 6. This is shown in FIG. 4A as a region 44 from time $t_{n-5}$ to time $t_{n-4}$ that corresponds to one sampling period, while assuming that the shake is accumulated. As a shake detection signal u(n−4) based on an image signal that is read out at the next time $t_{n-4}$, a value 45 that is close to an average value of the shake from the time $t_{n-5}$ to the time $t_{n-4}$ can be obtained, although it depends on the calculation method of the shake detection unit 70.

After sequentially repeating the above processing, a shake detection signal u(n+3) based on the image signal that is read out at time $t_{n+3}$ is as shown as a signal value 43. What is to be considered here is that the delay is larger than a so-called zero-order hold. In the example in FIG. 4A, since a delay for roughly one sampling period occurs, an error 46 occurs between the actual shake 41 and the detected shake detection signal u(n+3) indicated by the signal value 43. Since this error 46 is an error due to a delay, the error 46 becomes large at a point where the differential value of the signal is large. Considering the frequency space, a frequency component regarding which a sampling delay cannot be ignored appears as an error.

FIG. 4B shows the case of observing the same actual shake 41 with a shorter sampling period. At this time as well, the shake detection signal u(m) indicated by a signal value 55 is detected in a region 54, and the shake detection signal u(m) indicated by a signal value 53 is detected by repeating this. An error 56 at this time is obviously smaller than the error 46 in FIG. 4A. Thus, whether or not an error due to the sampling can be ignored is determined by the amount of delay determined by the frequency band (the band that is desired to be controlled, which is, here, the frequency of the shake) included in the signal that is to be observed, and the sampling period. That is to say, if the sampling period is sufficiently short with respect to the band that is desired to be controlled (in general, if the sampling frequency is about ten times the band that is desired to be controlled), the influence of the delay due to sampling can be ignored. However, the current sampling period for the image sensor 6 is usually about 60 frames per second, and cannot be regarded as a sufficient sampling period when considering a signal obtained when a camera shake occurs, for example, and the delay cannot be ignored.

Returning to FIG. 4A, compensation of a sampling delay based on prediction will be described. First, processing at the time $t_n$ will be considered. When M in Equations (1) to (4) described with reference to FIG. 3 is 3, the shake detection signals u(n), u(n−1), u(n−2), and u(n−3) that are obtained respectively at the time $t_n$, $t_{n-1}$, $t_{n-2}$, and $t_{n-3}$ are stored in the buffer memory. The calculation of Equation (1) is performed using these signals. In FIG. 4A, this calculation is schematically shown with lines that are drawn downward. That is to say, the prediction value y(n) is calculated from the shake detection signals u(n−1), u(n−2), and u(n−3) and filter coefficients $h_{n-1}(1)$, $h_{n-1}(2)$, and $h_{n-1}(3)$.

Thereafter, the filter coefficients h are updated by the adaptive algorithm processing unit 29, and the filter coefficients $h_n(1)$, $h_n(2)$, and $h_n(3)$ are obtained. Then, the shake prediction signal $y_p(n)$ is calculated based on Equation (4). In FIG. 4A, this calculation is schematically shown with lines that are drawn upward. That is to say, the shake prediction signal $y_p(n)$ is calculated from the shake detection signals u(n), u(n−1), and u(n−2) and the filter coefficients $h_n(1)$, $h_n(2)$, and $h_n(3)$. The value of the shake prediction signal $y_p(n)$ that is thus obtained is as indicated by a signal value 47 denoted by a dotted line.

As described using the region 44 and the signal value 45, the shake detection signal u(m) detected by the shake detection unit 70 delays for about one sampling period. For this reason, the shake prediction signal $y_p(n)$, which is a signal that is predicted from the signals obtained until now at the time $t_{n+1}$ corresponding to the next sampling timing, is used as an estimated value of the shake detection signal at the current time $t_n$. That is to say, the prediction value of the signal at the next sampling timing is used as the current estimated value. Since a future observation value u(n+1) is not used for calculating the shake prediction signal $y_p(n)$, the calculation can be performed without inconsistency. In a system where an accumulation delay occurs as shown in FIG. 4A, the difference between the shake prediction signal $y_p(n)$ of the signal at the next sampling timing and the actual shake 41 is small. The difference is small not only at the time $t_n$ but also at other time. That is to say, it can be understood that the prediction value of the signal of the next sampling is a good current estimated value.

As a result, it is possible to reduce the influence of the accumulation delay in the image sensor 6 and adjust the imaging optical system 3 based on the signals of the image sensor 6. Since the influence of the accumulation delay is small, more appropriate image stabilization control can be performed, and a higher-quality image with a reduced shake can be obtained.

Next, camera system control according to the present embodiment will be described with reference to flowcharts in FIGS. 5A and 5B. FIG. 5A shows the overall flow of the operations of the camera system, and particularly shows processing associated with the present invention. FIG. 5B shows exposure/optical control including the image stabilization control.

In FIG. 5A, upon the processing being started by, for example, turning on the power of the camera system, in step S110, the filter of the prediction signal generation unit 50 is reset. In this step S110, the buffered shake detection signals u(n), u(n−1), . . . , u(n−M+1), and u(n−M) and the filter coefficients $h_0(1)$, $h_0(2)$, . . . , $h_0(M)$ shown in FIG. 3 are replaced with predetermined values. Here, for example, all values are set to zero.

In step S120, it is determined whether or not the camera system is set in a fixed manner. For example, the shake will be small if the camera system is fixed as in the case of being set on a tripod, and therefore, the amount of calculation can be reduced by omitting the shake detection method according to the present embodiment. For example, if the absolute value of the shake detection signal u(m) detected by the shake detection unit 70 consecutively falls below a predetermined threshold value during a given period (i.e., if the shake detection signal u(m) stays within a predetermined range), it is determined that the camera system is set on a tripod or the like. Then, a flag indicating it is set.

In step S130, the turning off of the power is monitored. If the power is turned off, the operation is stopped and the processing ends, and if not, the processing proceeds to step S140. In step S140, exposure and image stabilization control are performed. Note that the specific processing in step S140 will be described later with reference to FIG. 5B.

In step S150, an image obtained by shooting is displayed. This is because the processing in steps S140 and S150 is performed during a shooting preliminary operation, and in step S150, image is not recorded, and an image is displayed on the display unit 9 provided in the camera body 1. The user can thereby check the composition, for example.

In step S160, a start of recording is determined. If an instruction to start recording is given by a user operation, the processing proceeds to step S170, and if not, the processing returns to step S120 and the shooting preliminary operation is repeated.

In step S170, the buffer memory is reset, and the image stabilization lens is centered. With this operation, the image stabilization lens is located at a position close to the center of the optical axis and can move in any direction to the same degree, and therefore, the probability that the image stabilization lens reaches the limit of the driving range decreases, and image quality can be improved and image stabilization range can be enlarged.

In step S180, the same processing as step S140, which is performed in the shooting preliminary operation, is performed. However, as will be described later, a sensor reading method may be changed so as to be appropriate for each mode. In step S190, a shot image is displayed and recorded. The shooting is performed by repeating steps S180 and S190. These steps are called a "shooting operation" here.

In step S200, the end of recording is determined. If an instruction to end the recording is given by a user operation, the processing proceeds to step S120 and returns to the shooting preliminary operation. If not, the processing returns to step S180 and the shooting operation is repeated.

Next, the exposure/optical control will be described with reference to FIG. 5B. The exposure/optical control shown in FIG. 5B is called from both step S140 during the shooting preliminary operation and step S180 during the shooting operation.

Upon the processing being called, in step S310, an image signal is read out from the image sensor 6. Simultaneously, reset is performed, and accumulation up to the next readout is started. Note that the readout in step S310 may be performed using methods appropriate respectively for the shooting preliminary operation and the shooting operation. For example, if the image to be output in the shooting preliminary operation is output to the display unit 9 provided in the camera body 1, an image fitted to the resolution of the display unit 9 need only be obtained, and accordingly, power consumption can be suppressed by performing thinning readout. Furthermore, in the shooting operation, the resolution and the readout range (so-called crop shooting) are changed based on user settings.

Upon the image signal being read out in step S310, the image stabilization control using the read image signal is started. In step S320, the shake detection unit 70 calculates the optical flow as described above, and obtains the shake detection signal u(m). In step S330, whether or not the camera system is set on a tripod is determined based on the flag that is set in step S120. If it is determined that the camera system is set on a tripod, the processing proceeds to step S340, and through-output is performed. The "through-output" mentioned here means that the shake detection signal u(m) detected by the shake detection unit 70 is output as-is as the signal to be used in the image stabilization control. This corresponds to switching the switch 32 in FIG. 3 to use the input shake detection signal u(m) as-is as the control signal.

On the other hand, if the camera system is not set on the tripod, the processing proceeds to step S350, and the shake prediction signal is calculated and output. Here, the shake prediction signal $y_p$ that has been processed by the filter shown in FIG. 3 is output as the control signal to be used in the image stabilization control. This corresponds to switching the switch 32 in FIG. 3 to use the shake prediction signal $y_p(n)$ as the control signal.

In step S360, the position of the image stabilization lens is controlled based on the control signal obtained in step S340 or S350, thereby driving the imaging optical system 3. After the above processing ends, the processing returns to the processing in FIG. 5A.

As described above, according to the first embodiment, the influence of the delay can be reduced in the case of adjusting the imaging optical system 3 using the image signal of the image sensor in which an accumulation delay occurs. As a result, the influence of the accumulation delay is small, and accordingly, more appropriate image stabilization control is performed, and the picture quality can be improved.

Note that although the above example has described the case of performing the image stabilization control by driving the image stabilization lens included in the imaging optical system 3, the image stabilization control can also be performed by driving the image sensor 6.

Furthermore, although the above example has described the case of predicting a shake, the present invention is not limited to the shake prediction and the image stabilization lens control, and is applicable to various kinds of control of each part of the camera system using the image signal that is output from the image sensor. For example, a configuration is conceivable in which the prediction value is obtained using a signal indicating a focus state of an image in the case of performing focus adjustment using imaging plane phase difference AF, and using a signal indicating luminance information that indicates the brightness of an image in order to control exposure, thereby controlling the focus lens, the diaphragm, the shutter speed, and the like.

Modification

Figure 6A:
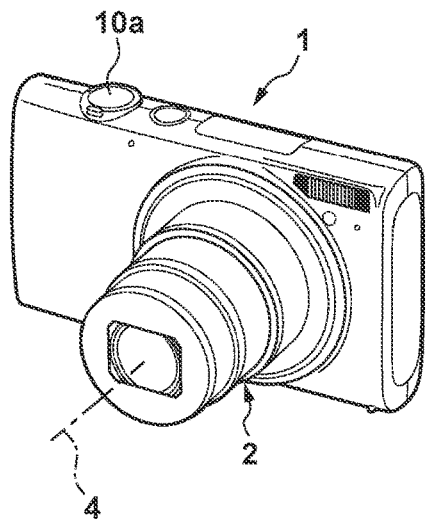
FIGS. 6A to 6C are external views and a block diagram showing a configuration of an image capturing apparatus according to a modification.
Figure 6B:
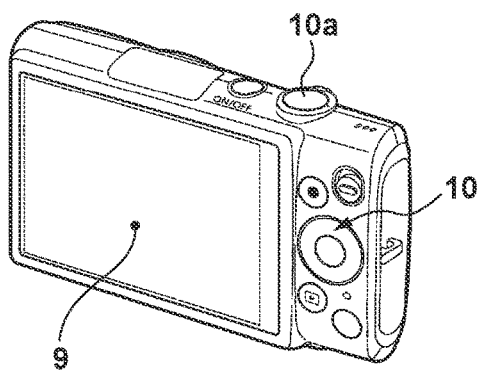
Figure 6C:
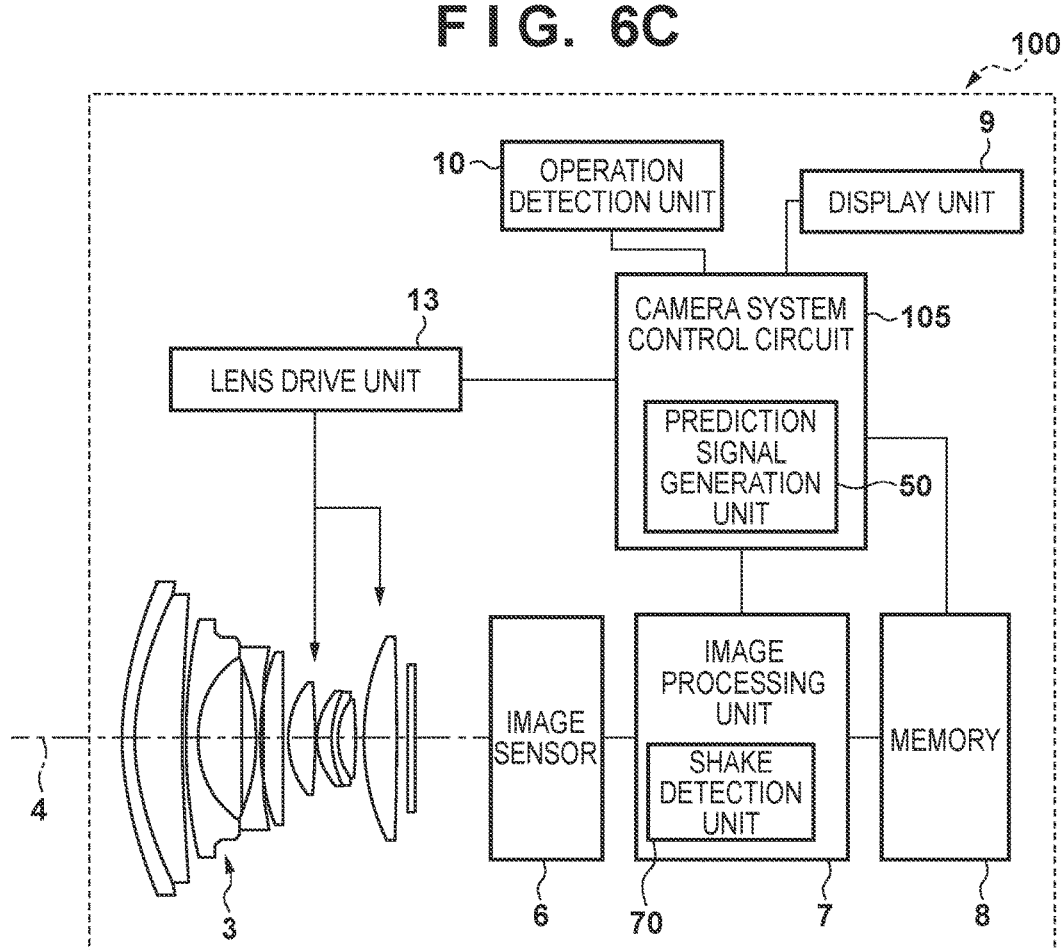

A modification of the present invention is shown in FIGS. 6A to 6C. FIGS. 6A to 6C are diagrams showing an image capturing apparatus 100 according to the modification, and show the case where a lens unit and a camera body are integrally configured. FIGS. 6A and 6B are perspective views of the appearance of the image capturing apparatus taken from the front and the back, and FIG. 6C is a block diagram showing an electrical configuration thereof. In this image capturing apparatus, the boundary between the lens unit and the camera body is not clear, and do not individually have a system control unit in many cases. In FIG. 6C, the camera system control circuit 105 controls the imaging optical system 3 by directly controlling the lens drive unit 13. Note that elements having functions similar to those in FIG. 1 will be given the same reference numerals, and a description thereof will be omitted.

In the image capturing apparatus 100 having the configuration shown in FIG. 6A to 6C as well, processing similar to that in the first embodiment can be performed.

Second Embodiment

Next, a second embodiment of the present invention will be described. FIG. 7 is a block diagram showing a configuration of a prediction signal generation unit 50' according to the second embodiment, and the prediction signal generation unit 50' can be used in place of the prediction signal generation unit 50 shown in FIG. 1 or 6C. Note that since the elements other than the prediction signal generation unit 50' are similar to those shown in FIG. 1 or 6C, a description thereof will be omitted here.

A difference between the prediction signal generation unit 50' shown in FIG. 7 and the prediction signal generation unit 50 shown in FIG. 3 lies in further having a comparator 35 and a switch 36. The other elements are similar to those shown in FIG. 3, and accordingly, the same reference numerals will be assigned thereto and a description thereof will be omitted.

In the second embodiment, the shake detection unit 70 also obtains data regarding reliability in addition to the shake detection signal u(m). Note that a method for acquiring the data regarding reliability will be described later. The reliability data is input to the comparator 35. If it is determined that the obtained reliability is lower than predetermined reliability, the switch 36 is operated, and the input to the buffer memory is switched from the shake detection signal u(n) of the shake detection unit 70 to the prediction value y(n) at the previous sampling timing obtained by the prediction signal generation unit 50.

If the adaptive filter is appropriately formed, the prediction value y(n) is to be a good prediction value of the shake detection signal u(n). With a small number of samples, the signal will not be inconsistent even if the prediction value y(n) is used in place of the shake detection signal u(n). For this reason, in the case where, for example, the shake detection unit 70 fails the detection, more appropriate processing than using a less reliable shake detection signal can be performed.

Figure 8A:
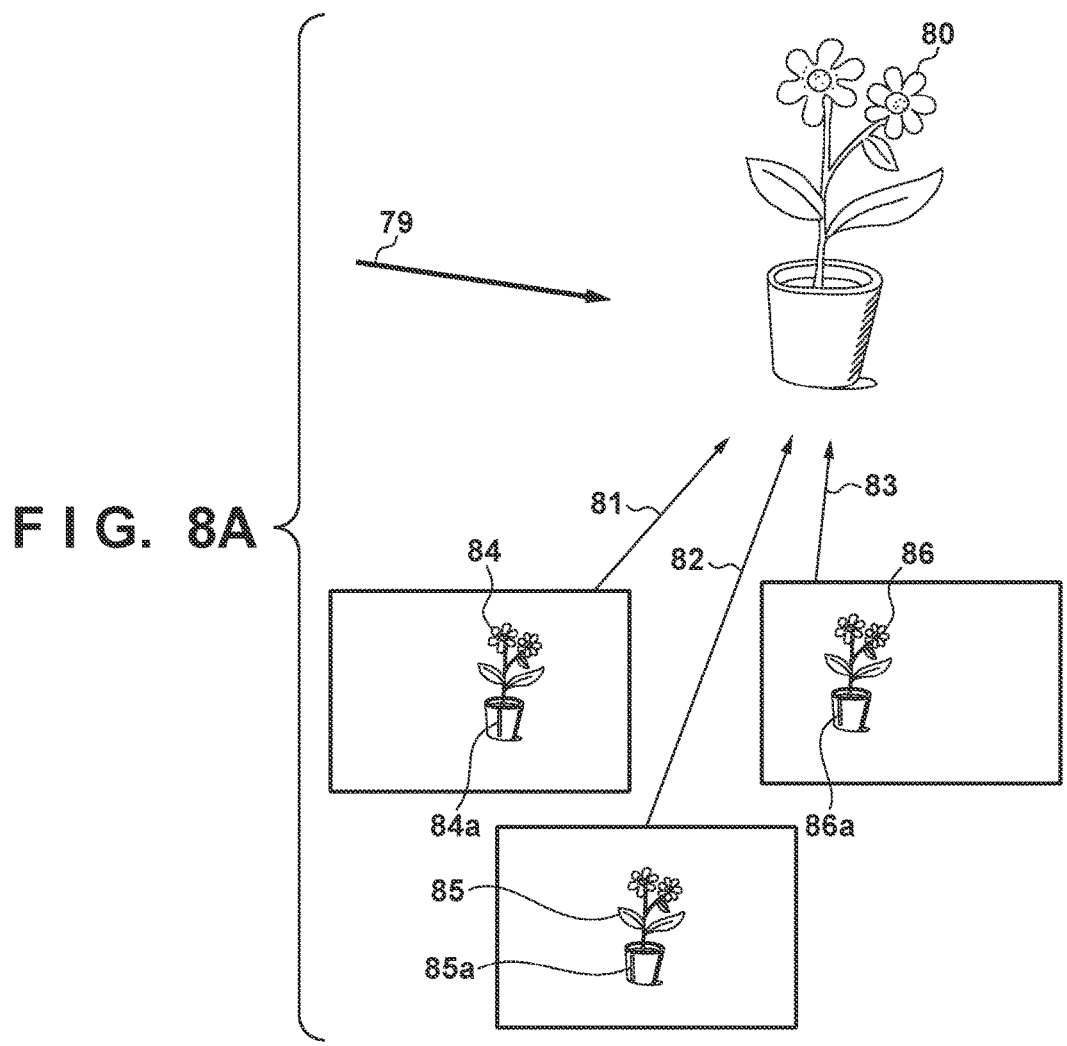
FIGS. 8A and 8B are diagrams for illustrating a method for generating reliability data according to the second embodiment.

Here, a description will be given, using FIGS. 8A and 8B, of a situation where the reliability lowers, and the method for generating the reliability data. FIG. 8A is a diagram schematically showing a state of acquiring images in time series from a plurality of visual points. An arrow 79 indicates a light beam from a light source, and 80 denotes an object. As an example, FIG. 8A schematically shows that images are obtained from three visual points indicated by arrows 81, 82, and 83. As shown in FIG. 8A, when shooting is performed from the plurality of visual points 81, 82, and 83, object images 84, 85, and 86 of the same object 80 are formed at different positions in the respective images. Note that 84a, 85a, and 86a respectively indicate positions of mirror reflection components on the object images 84, 85, and 86.

Figure 8B:
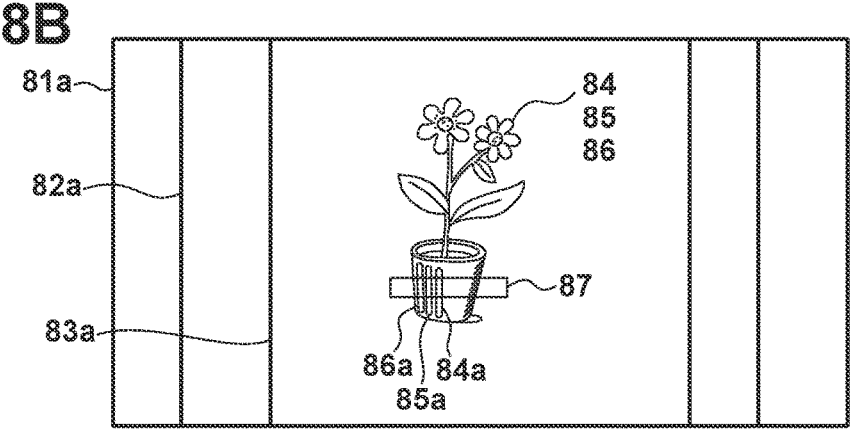

When the optical flow is obtained from the object images 84, 85, and 86 by the shake detection unit 70, and these images are overlapped such that the object 80 is in the same position, an image shown in FIG. 8B is obtained. That is to say, FIG. 8B shows a state where the object images 84, 85, and 86 overlap one another, and conversely, frames 81a, 82a, and 83a, which indicate image object acquisition areas, are shifted. 87 denotes a frame that indicates a partial region to be used for positioning.

In the image in FIG. 8B, the mirror reflection components 84a, 85a, and 86a are located at different positions, and with such an object, the degree of coincidence of the images lowers. In a situation where the degree of coincidence of the images lowers, the values of the optical flow determined based on the mirror reflection component differs from the optical flow determined based on a diffuse reflection component. Which of these values to be selected depends on the signal intensity of the mirror reflection component and the diffuse reflection component, the size of the region of interest at the time of calculating the optical flow, and the like. That is to say, it is expected that the optical flow is instable.

Therefore, such a degree of coincidence of the images can be used as reliability data. If the degree of coincidence of the images is low, reliability data that indicates low reliability is output. As another method, the degree of coincidence of the images may be made dimensionless by dividing the degree of coincidence of the images by the brightness or the rate of change of the degree of coincidence.

As described above, according to the second embodiment, more appropriate image stabilization control can be performed even in the case where the reliability of the shake detection signal obtained from the shake detection unit is low.

Third Embodiment

Figure 9:
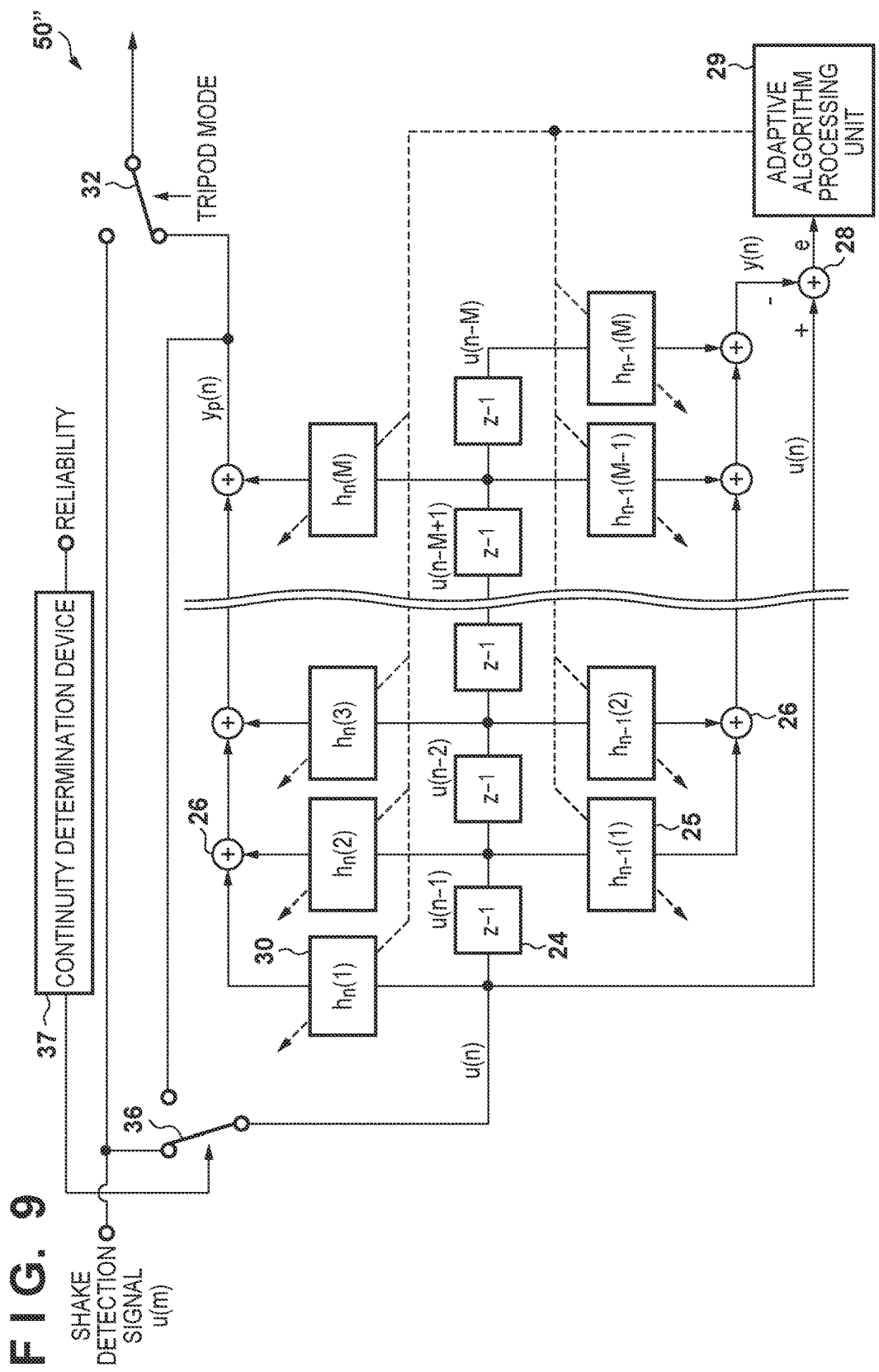
FIG. 9 is a block diagram showing a configuration of a prediction signal generation unit according to a third embodiment.

Next, a third embodiment of the present invention will be described. FIG. 9 is a block diagram showing a configuration of a prediction signal generation unit 50" according to the third embodiment, and the prediction signal generation unit 50" can be used in place of the prediction signal generation unit 50 shown in FIG. 1 or FIGS. 6A to 6C. Note that since the elements other than the prediction signal generation unit 50" is similar to those shown in FIG. 1 or FIGS. 6A to 6C, a description thereof will be omitted here.

The prediction signal generation unit 50" shown in FIG. 9 is similar to the prediction signal generation unit 50' shown in FIG. 7, but is different in that a continuity determination device 37 is provided in place of the comparator 35. A shake detection signal u(m) optical flow, which is the output of the shake detection unit 70, is input to the continuity determination device 37. In the case of periodically observing the movement of an object, it is hard to consider that the value of the shake detection signal u(m) suddenly changes beyond a threshold value. That is to say, it is hard to consider that an object which moves from one end to the other end of the screen during a period is a main object. Therefore, in the example in FIG. 9, the continuity determination device 37 determines the reliability based on the time-series output of the shake detection unit 70. If the value of the shake detection signal u(m) changes beyond the threshold value, it is determined that the reliability is low, then the switch 36 is operated to switch the input to the buffer memory from the shake detection signal u(m) from the shake detection unit 70 to the prediction value y(n) at the previous sampling timing of the prediction signal generation unit 50".

As described above, according to the third embodiment, more appropriate control can be performed even in the case where the reliability of the shake detection signal obtained from the shake detection unit is low.

Fourth Embodiment

Figure 10B:
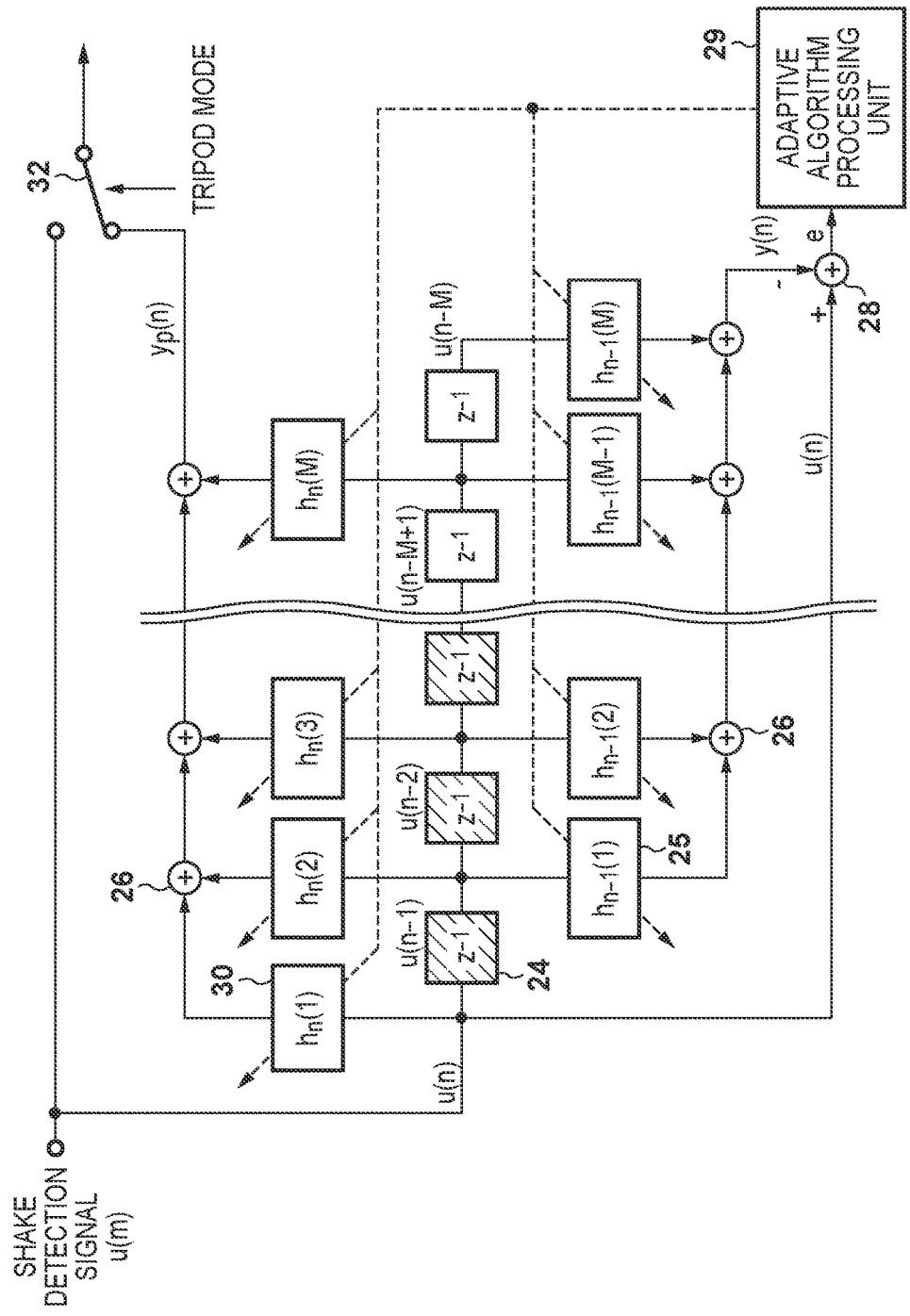

Next, a fourth embodiment of the present invention will be described. Another switching control of the switch 32 will be described using FIGS. 10A and 10B. FIGS. 10A and 10B are block diagrams showing a configuration of the prediction signal generation unit 50', which is similar to the configuration shown in FIG. 7. However, delay units 24 that are shaded in FIGS. 10A and 10B indicate that the immediately previous buffer content is the prediction value y(n) of the previous sampling timing obtained by the prediction signal generation unit 50. That is to say, in FIG. 10A, although the shake detection signals u(n), u(n−2), and u(n−M+2) were to be buffered in the case where the reliability of the shake detection signals is high, the prediction values y(n), y(n−2), and y(n−M+2) st the respective previous sampling timings have been buffered. Also, FIG. 10B shows that the prediction values y(n), y(n−1), and y(n−2) have been buffered in place of the shake detection signals u(n), u(n−1), and u(n−2).

FIG. 10A is a schematic diagram showing the case where the replacement with the prediction value y(n) at the previous sampling timing is not consecutive but the occurrence frequency thereof has reached a fixed ratio, and FIG. 10B shows the case where the replacement with the prediction value y(n) at the previous sampling timing has consecutively occurred.

As shown in FIG. 10A, a value buffered at the M+1$^{th}$ sampling timing is referenced in order to generate the current shake prediction signal $y_p(n)$. If many of the referenced values are signals of the prediction value y(n) of the previous sampling timing, the shake detection signal u(n) of the shake detection unit 70 is not referenced and almost only the prediction values y(n) are used, and then, there is a possibility that the shake prediction signal $y_p(n)$ will not be a sufficiently good prediction value. Therefore, if the number of prediction values y(n) stored in the buffer memory exceeds a predetermined number, the switch 32 is operated, and the image stabilization lens is operated based on the signal of the shake detection unit 70. This is because, even if the signal of the shake detection unit 70 is affected by a delay, it is considered to be better than the prediction value y(n).

Similarly, if the replacement with the prediction value y(n) consecutively occurs as in FIG. 10B, it is also conceivable that the quality of the shake prediction signal $y_p(n)$ rapidly lowers. Therefore, if the number of the prediction values y(n) stored in the buffer memory consecutively exceeds the predetermined number, the switch 32 is operated, and the image stabilization lens is operated based on the shake detection signal u(n) from the shake detection unit 70, similarly as in the case of FIG. 10A.

Fifth Embodiment

Figure 11:
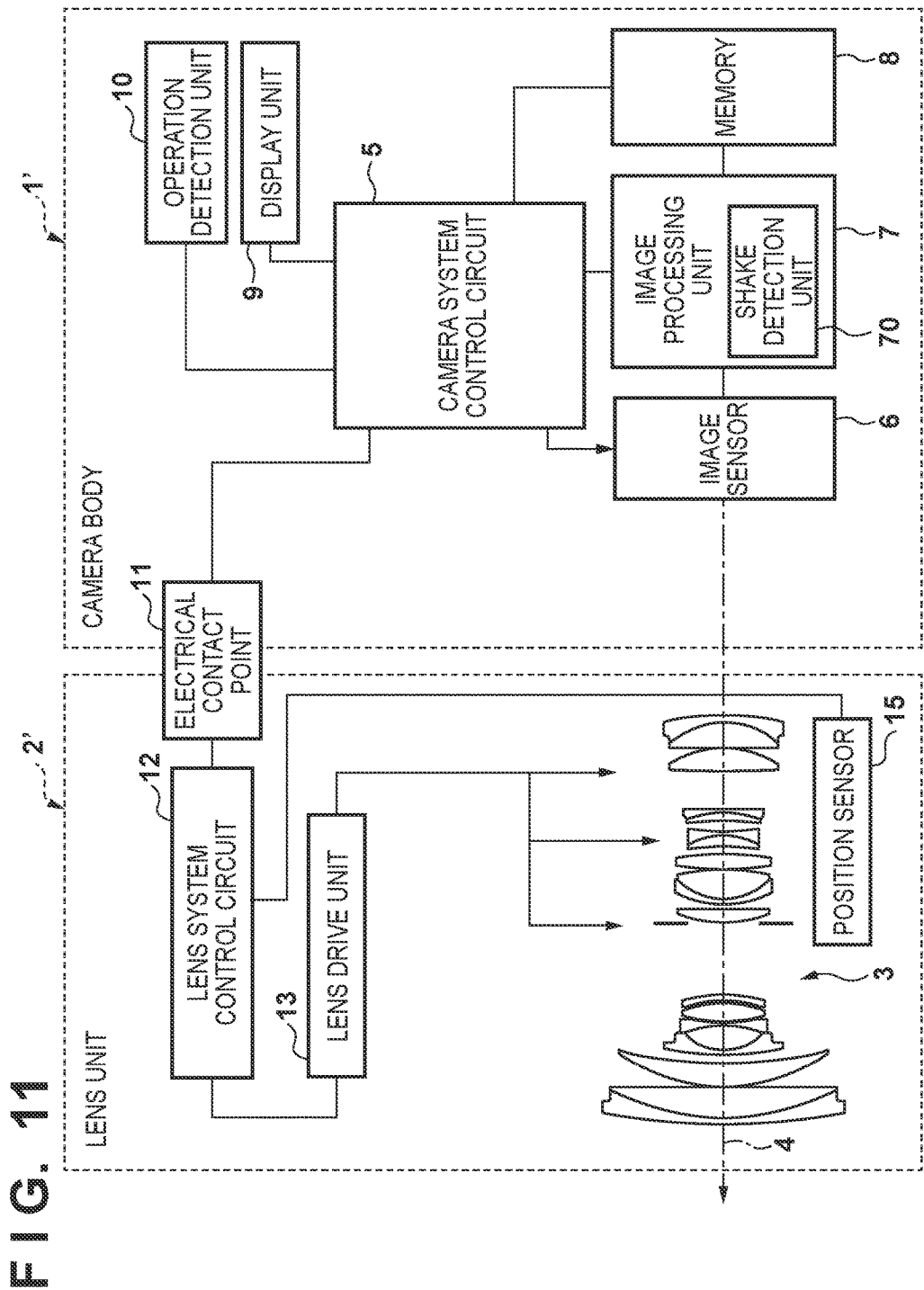
FIG. 11 is a block diagram showing an image capturing apparatus according to a fifth embodiment of the present invention.

Next, a fifth embodiment of the present invention will be described. FIG. 11 is a block diagram showing a schematic configuration of a camera system according to the fifth embodiment. Note that the camera system according to the fifth embodiment is the camera system described in the first embodiment with reference to FIG. 1 in which the shutter mechanism 14 is not provided and to which a position sensor 15 is added. Accordingly, elements similar to those in FIG. 1 will be given the same reference numerals, and a description thereof will be omitted as appropriate.

A lens unit 2' according to the fifth embodiment includes an imaging optical system 3 constituted by a diaphragm (constituent member) and a plurality of lenses including a focus lens and a image stabilization lens (constituent member) that are arranged on an optical axis 4, a lens system control circuit 12, a lens drive unit 13, and a position sensor 15. The position sensor 15 detects the positions of the focus lens and the image stabilization lens, and outputs respective lens position signals.

Note that, in the fifth embodiment, the camera system control circuit 5 obtains drive data for driving the image stabilization lens through later-described processing based on a shake detection signal obtained from the shake detection unit 70 and the amount of lens movement of the image stabilization lens, and transmits the drive data to the lens unit 2'.

In the fifth embodiment as well, as described above with reference to FIGS. 2A to 2C, an optical flow, which is a shake detection signal based on the comparison between a plurality of images, is obtained by the shake detection unit 70.

In the processing described with reference to FIG. 2, if an object is stationary, movement of an image occurs due to a camera shake, and therefore the camera shake is detected. If the object is moving, a shake that is a combination of the movement of the object and a camera shake is detected.

Figure 12:
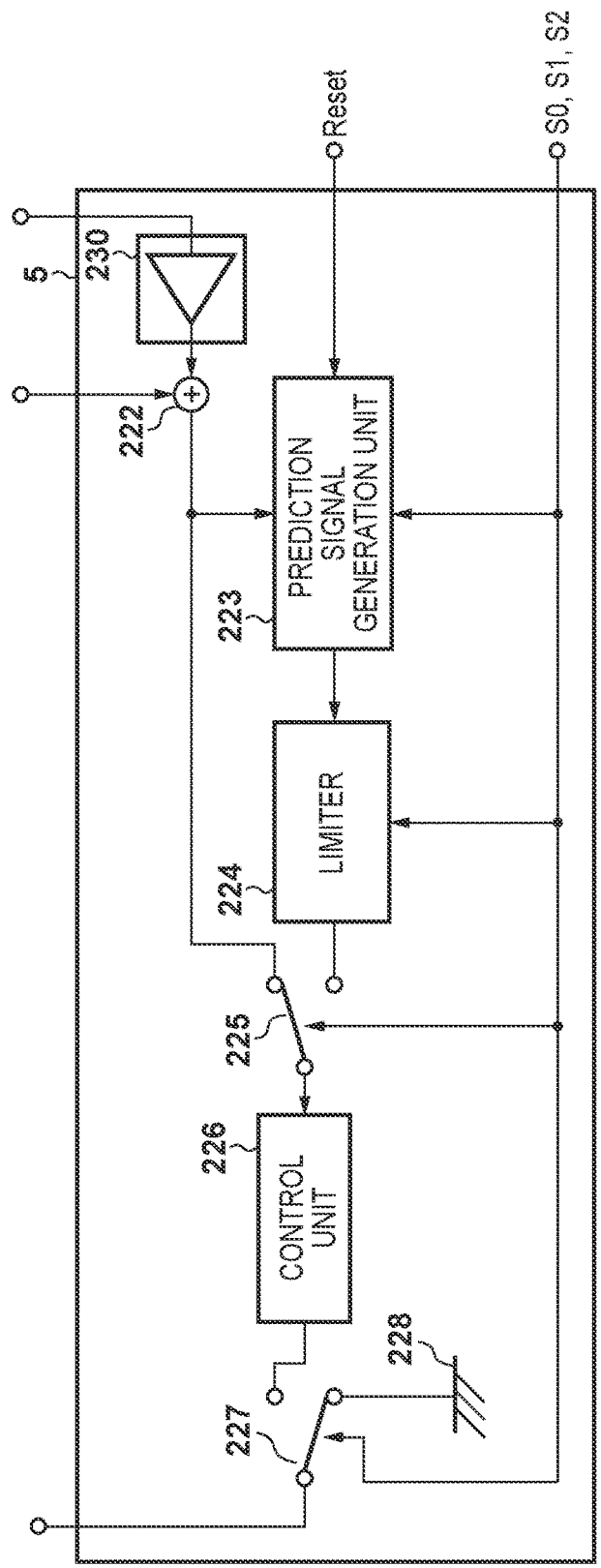
FIG. 12 is a block diagram showing a partial schematic configuration of a camera system control circuit according to a fifth embodiment.

FIG. 12 is a block diagram showing an exemplary configuration for performing image stabilization according to the fifth embodiment that is included in the camera system control circuit 5.

In the configuration shown in FIG. 12, the operation is switched based on a Reset signal, a signal S0, a signal S1, and a signal S2. For example, the Reset signal is output at the time when, for example, the power of the camera system is turned on or a lens is replaced. The signal S0 is a signal that is output when an instruction not to perform the image stabilization processing is given, and the signal S1 is a signal that is output when an instruction to perform the image stabilization processing is given. The signal S2 is a signal that is output when in a state where the image stabilization processing cannot be performed when the instruction to perform the image stabilization processing has been given. For example, the signal S0 is output if the image stabilization processing is turned off in accordance with a user operation, the signal S1 is output if the image stabilization processing is turned on, and the signal S2 is output if the shutter release button (not shown) is pressed in this state. Furthermore, in addition to the user operation, the control may be performed such that the signal S0 is output if the camera system is fixed to a tripod or the like and it is determined that the image stabilization processing is not necessary, and the signal S1 is output if it is determined that the image stabilization processing is necessary. Note that the cases where the Reset signal, the signal S0, the signal S1, and the signal S2 are output are not limited to the above example, and can be set as appropriate.

In FIG. 12, a gain adjustment unit 230 obtains the amount of lens movement by comparing a plurality of lens position signals that are output from the position sensor 15 and acquired at different time, and converts the obtained amount of the lens movement into the amount of change of the angle of view in the image sensor 6. The relationship between the amount of lens movement and the amount of change of the angle of view in the image sensor 6 depends on characteristics of the optical system, and the amount of change of the angle of view in the image sensor 6 is obtained based on this information and output to the adder 222.

The adder 222 adds the amount of change of the angle of view obtained from the gain adjustment unit 230 and the shake detection signal from the shake detection unit 70. By this addition, the camera shake amount u(m) (combined signal) in the case where the image stabilization processing is not performed, i.e., in the case where the center of the image stabilization lens is located at a reference position that coincides with the optical axis can be obtained.

The prediction signal generation unit 223 is for predicting the current camera shake amount based on the input camera shake amount u(m) and outputting the shake prediction signal indicating the predicted camera shake amount, and the operation is switched based on the Reset signal, the signal S0, the signal S1, and the signal S2. Note that the internal configuration and specific operations of the prediction signal generation unit 223 will be described later with reference to FIG. 13.

A limiter 224 sets an upper limit and a lower limit of the shake prediction signal obtained from the prediction signal generation unit 223 and restricts the shake prediction signal. In general, prediction accuracy in processing based on prediction lowers with the lapse of time, and therefore, the upper limit and the lower limit of the shake prediction signal from the prediction signal generation unit 223 is set in advance. In this case, there are possible methods such as setting predetermined upper and lower limits of the shake prediction signal, setting the upper limit and the lower limit of the shake prediction signal in accordance with the time that has elapsed since the signal S2 was input, or setting the upper limit and the lower limit of the shake prediction signal in accordance with the charge accumulation time. Then, processing for cutting off, at the upper limit or lower limit, the shake prediction signal that exceeds the set upper limit or falls below the set lower limit is performed. Note that the limiter 224 is not an essential element in the invention of the present application.

A switch 225 is subjected to switching control by the signal S0, the signal S1, and the signal S2. If the signal S0 or the signal S1 is input, the signal of the adder 222 is selected, and if the signal S2 is input, the signal of the limiter 224 is selected. The control unit 226 compensates the gain and the phase of the signal selected by the switch 225 such that the feedback system is stabilized.

A switch 227 is subjected to switching control by the signal S0, the signal S1, and the signal S2. If the signal S0 is input, the switch 227 is grounded to a ground portion 228. Thus, the driving of the imaging optical system 3 is stopped, and the image stabilization is not performed. If the signal S1 or the signal S2 is input, the switch 227 is switched to be connected to the control unit 226, and the image stabilization lens is driven in accordance with a control signal from the control unit 226.

With the above configuration and control, a ground level signal is output as the control signal for the image stabilization lens if the signal S0 is input, and a signal based on the camera shake amount u(m) that is output from the adder 222 is output as the control signal if the signal S1 is input. If the signal S2 is input, a signal based on the camera shake amount estimated by the prediction signal generation unit 223 is output as the control signal for the image stabilization lens.

Figure 13:
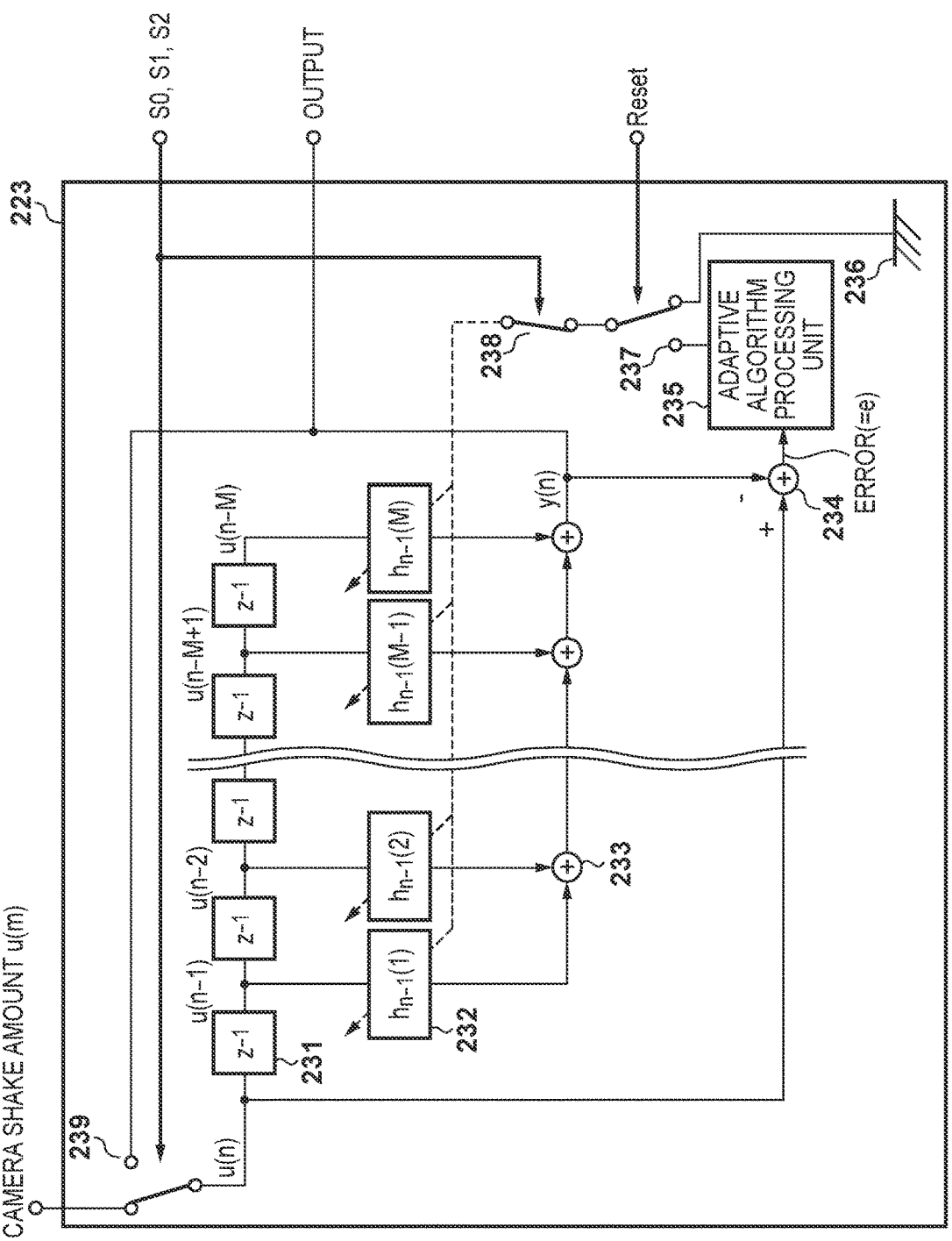
FIG. 13 is a block diagram showing a configuration of a prediction signal generation unit according to the fifth embodiment.

Next, the configuration and processing of the prediction signal generation unit 223 will be described. FIG. 13 is a block diagram showing an exemplary configuration of the prediction signal generation unit 223 included in the camera system control circuit 5 according to the fifth embodiment. As described above, the camera shake amount u(m) that is output from the adder 222 is input to the prediction signal generation unit 23. Note that m in the bracket indicates an $m^{th}$ sampling timing.

The input camera shake amount u(m) is delayed by one period by a plurality of delay units $231(z^{-1})$ that are connected in series. Assuming that the latest read image signal is an $n^{th}$ sample, the camera shake amount obtained by delaying the camera shake amount u(n) by one period is a camera shake amount u(n−1), which indicates a camera shake amount that is based on an image signal sampled in the n−$1^{th}$ sampling period. Thereafter, similarly, the camera shake amounts u(n−2), . . . , u(n−M+1), and u(n−M) are defined. These camera shake amounts u(n), u(n−1), . . . , u(n−M+1), and u(n−M) for a plurality of periods are accumulated in a buffer memory (not shown) in the camera system control circuit 5. Efficient buffering can be achieved by forming the buffer memory using, for example, a ring buffer, and replacing data at a current writing position and changing the writing position every time a new camera shake amount u(n) is input. Then, by the calculation denoted by Equation (1), filter coefficients 232 and the buffered camera shake amounts are subjected to convolution integration by a series of adders 233. Thereby, a prediction value y(n) of the latest camera shake amount u(n) is obtained from a predetermined number of camera shake amounts u(m) up to the camera shake amount u(n−1) at the previous sampling timing, of the camera shake amounts u(m) for the plurality of periods accumulated in the buffer memory. Note that $h_{n-1}$ indicates the filter coefficients 232 that has been obtained until the n−$1^{th}$ sampling timing.

$$y(n) = \sum_{m=1}^{M} h_{n-1}(m)u(n-m) \qquad (1)$$

Equation (1) indicates that time-series prediction is performed by linear combination. It is known that a smooth signal and a highly repetitive signal can be well approximated in the form like Equation (1). Many signals for controlling the imaging optical system 3 have these characteristics.

An error e at this time can be defined by the next Equation (2). This error e can be obtained by subtracting the prediction value y(n) obtained by the series of adders 233 from the latest camera shake amount u(n) using an adder 234.

$$e = u(n) - y(n) \qquad (2)$$

With this definition, a filter for performing adaptively predicting the next period using a known adaptive algorithm in an adaptive algorithm processing unit 235 is formed. As an exemplary adaptive algorithm, an equation for updating the filter coefficients using an LMS algorithm is expressed by Equation (3). Equation (3) is an exemplary adaptive algorithm, whereas other algorithms such as NLMS and RLS may alternatively be used.

$$h_n(i) = h_{n-1}(i) + \mu e u(i) \qquad (3)$$

(i=1, 2, . . . , M)

Note that μ in Equation (3) above indicates a step size parameter. A filter is adaptively formed by repeating the calculation of Equations (1) to (3) for every sampling period and updating h.

A switch 237 is switched by the Reset signal. If the reset signal is output, the switch 237 is grounded to the ground portion 236, and the filter coefficients 232 are reset. That is to say, a filter coefficients $h_{n-1}$ are initialized. If the Reset signal is canceled, the switch 237 is connected to the adaptive algorithm processing unit 235, and the filter coefficients 232 are updated. Even if the characteristics of the shake change as in the case where a different photographer shoots an image or due to lens replacement or the like, the filter coefficients 232 can be initialized by performing the reset operation.

A switch 238 is switched in accordance with the signal S0, the signal S1, and the signal S2. The switch 238 is closed if the signal S0 and the signal S1 are input, and the switch 238 is opened if the signal S2 is input. Thereby, the filter coefficients 232 are updated if the signal S0 and the signal S1 are input, and the updating of the filter coefficients 232 is stopped if the signal S2 is input.

Then, the camera shake amount u(m) is delayed by delay units 231, and convolution integration is performed by the series of adders 233 with the calculation expressed by the next Equation (5) using the above-set filter coefficients 232, thereby obtaining a prediction value y(n+1).

$$y(n+1) = \sum_{m=1}^{M} h_n(m)u(n-m+1) \qquad (5)$$

In Equation (5) above, the right-hand side is the value obtained until the $n^{th}$ sampling, and the left-hand side is the prediction value of the camera shake amount at the n+$1^{th}$ sampling timing.

A switch 239 is switched in accordance with the signal S0, the signal S1, and the signal S2, similarly to the switch 238, and the switch 239 enters a state of sending the input camera shake amount u(n) to a later stage if the signal S0 or the signal S1 is input. If the signal S2 is input, the switch 239 inputs the aforementioned prediction value y(n+1) as the camera shake amount at the next sampling timing. Thus, the coefficient obtained by the adaptive algorithm in the adaptive algorithm processing unit 235 is used, and this error is small if y(n+1) is a good prediction value of the camera shake amount u(n+1), then the calculation is recursively performed using y(n+1) in place of the camera shake amount u(n+1). Since the shake detection signal cannot be obtained in an exposure state after the signal S2 is input, the prediction value is similarly obtained with recursive calculation with the filter shown in FIG. 13 until the signal S0 or the signal S1 is input.

Thus, with the prediction signal generation unit 223 shown in FIG. 13, the adaptive filters are updated based on the camera shake amount u(m) that is obtained while the signal S0 or the signal S1 is input, and the prediction value y(n+1) after the signal S2 is input based thereon is output.

Note that although the prediction signal generation unit 223 shown in FIG. 13 uses an adaptive filter, signals at several sampling timings immediately before the signal S2 is input may be linearly approximated and moved along this line. This is because the error is small even if linear approximation is performed in the case of a very short exposure period.

Figure 14:
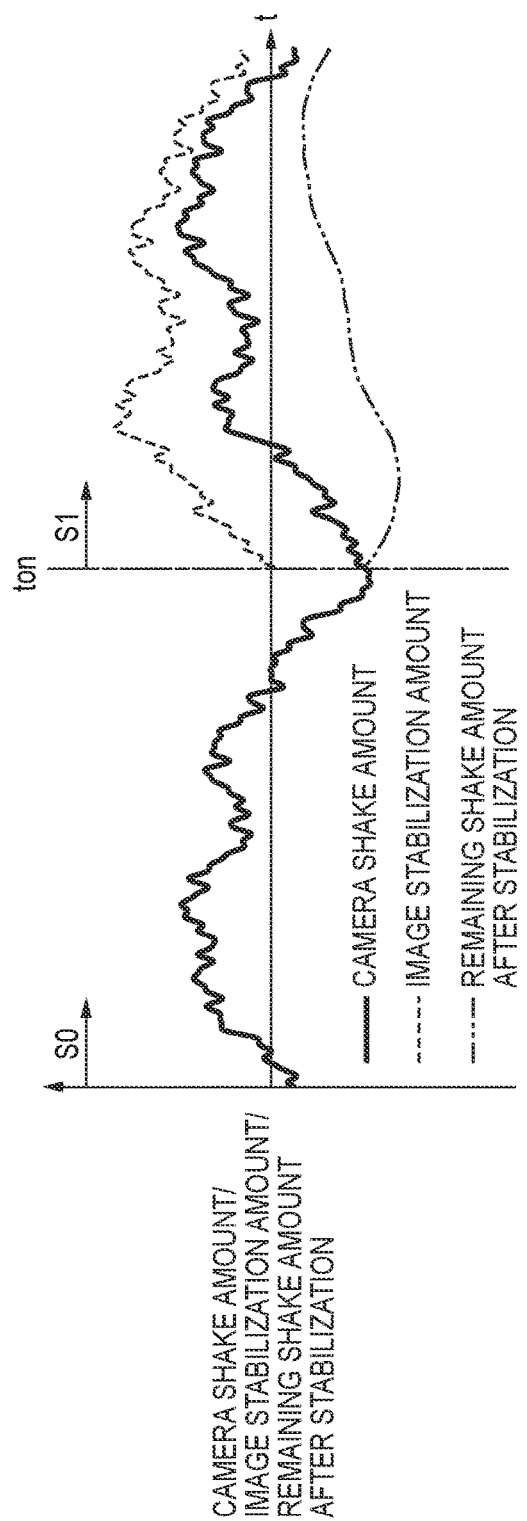
FIG. 14 is a schematic diagram of a shake signal.

Next, a signal detected before and after the image stabilization is started will be described using FIG. 14. In FIG. 14, the horizontal axis indicates the time, and the vertical axis indicates the actual camera shake amount, the image stabilization amount, and the remaining shake amount after stabilization. The remaining shake amount after stabilization is defined as the difference between the actual camera shake amount and the image stabilization amount, and corresponds to the shake detection signal detected by the shake detection unit 70. Here, the case is shown where the signal S0 is changed to the signal S1 at time $t_{on}$ near the center in FIG. 14, the image stabilization processing is changed from an off state to an on state, and the image stabilization processing is started.

In a state where the signal S0 is input before the time $t_{on}$, the image stabilization processing is not performed. Accordingly, the image stabilization amount is 0, and the camera shake amount coincides with the remaining shake amount.

In a state where the signal S1 is output after the time $t_{on}$, the image stabilization processing is performed, the image stabilization amount has a waveform similar to the camera shake amount, and the remaining shake amount has a waveform with a shape different from the camera shake amount, as shown in FIG. 14. Here, the image stabilization amount does not completely coincide with the camera shake amount due to the influence of the control system such as a delay in following, since the image stabilization amount is the amount of control based on the signal that is read out by the image sensor 6, for example.

If the shake is stabilized by the image stabilization lens included in the imaging optical system 3, the signal characteristics greatly change before and after the time $t_{on}$ at which the signal S1 is output. Here, the image stabilization amount indicated by a dotted line in FIG. 14 can be obtained using a lens position signal of the image stabilization lens obtained from the position sensor 15. As mentioned above, the camera shake amount indicated by a thick solid line itself can be detected even after the signal S1 is output, by adjusting the signal of the position sensor 15 using the gain adjustment unit 230 and adding the adjusted signal to the shake detection signal obtained by the shake detection unit 70. The characteristics of the camera shake amount do not change before and after the signal S1 (OFF state→ON state of the image stabilization processing), which is convenient for performing the prediction.

As described in FIG. 13, the prediction signal generation unit 223 stores the frequency characteristics of the camera shake amount u(m) as the filter coefficients using the adaptive filter. If the signal characteristics change, the filter coefficients also need to be greatly updated, whereas, with the configuration according to the fifth embodiment, the signal characteristics do not change before and after the signal S1 due to the adder 222, and it is therefore possible to continue the prediction using the filter coefficients that has been used thus far.

This control is particularly effective in the case where, with the start of the image stabilization processing, the signal S2 is output immediately after the signal S1 is output (e.g., exposure in the still image shooting is started). That is to say, in the case of performing the prediction using the remaining shake amount after stabilization (shake detection signal), if the characteristics of the remaining shake amount after stabilization greatly change due to the signal S1, the filter coefficients need to be updated, but if the signal S2 is output before the updating ends, there is a possibility that the prediction becomes inappropriate. On the other hand, with the control according to the fifth embodiment, even if the signal S2 is output immediately after the signal S1 is output, the prediction will not become inappropriate.

FIGS. 15A to 15C are diagrams for illustrating the camera shake amount and the remaining shake amount after stabilization in the case of performing the prediction processing and in the case of not performing the prediction processing. In order to facilitate understanding of the description, it is assumed in FIGS. 15A to 15C that the actual shake applied to the camera system is a simple sine wave. Furthermore, it is assumed here that the signal S0, the signal S1, and the signal S2 are switched by an operation made on a shutter button (not shown) when shooting a still image. Specifically, the signal S0 is output in a state where the shutter button is not pressed, the signal S1 is output in a state where the shutter button is half-pressed and an instruction to prepare for shooting has been given, and the signal S2 is output in a state where the shutter button is full-pressed and an instruction to record an image has been given.

FIG. 15A is a graph showing the case of performing the linear prediction using a plurality of signals obtained immediately before the prediction, FIG. 15B is a graph showing the case of performing the shake prediction using the adaptive filter shown in FIG. 13, and FIG. 15C is a graph showing the case of not performing the shake prediction. Note that, in FIGS. 15A to 15C, the horizontal axis indicates the time, and the vertical axis indicates the actual camera shake amount, the detected camera shake amount, the image stabilization amount, or the remaining shake amount after stabilization.

Time t1 is the timing of receiving the signal S2 (e.g., the timing of starting exposure), and at the time before the time t1, the image stabilization processing is being performed, i.e., the signal S1 is output. At the time after time t2 after the exposure, the image stabilization processing is not performed, i.e., the signal S0 is output. The period from the time t1 to the time t2 in which the signal S2 is output is the time in which the exposure is being performed, and the shake detection signal based on the image signal output from the image sensor 6 cannot be obtained. For this reason, in this period, the image stabilization control based on the prediction value is performed. Furthermore, in FIGS. 15A to 15C, 263, 264, and 265 denote the magnitude of the remaining shake amount after stabilization in the case of using the respective methods.

In FIGS. 15A to 15C, thick solid lines denote the actual camera shake amount applied to the camera system, and alternate long and short dash lines denote the detected camera shake amount u(m) or the prediction value y(m) that is output by the prediction signal generation unit 223 when the exposure is being performed. Broken lines denote the image stabilization amount, and alternate long and two short dashes lines denote the shake detection signal, which is the remaining shake amount after stabilization. Note that the camera shake amount u(m) is substantially equal to the actual camera shake amount while the shake is correctly being detected, and indicates, during the exposure, the prediction value y(m) and corresponds to the signal output from the switch 225 in FIG. 12. As described using FIG. 14, if the signal S1 is output, the stabilization amount of the image stabilization lens is obtained based on the camera shake amount u(m), which is obtained by adding the shake detection signal to the amount of change of the angle of view, as mentioned above. The image stabilization amount is a response to shake control input regarding which mechanical following characteristics are considered, and corresponds to the image stabilization amount achieved via the control unit 226 in FIG. 12. The remaining shake after stabilization is the difference between the actual camera shake amount and the image stabilization amount. If the remaining shake after stabilization is small during the exposure, the shake can be considered to be small.

A case of performing the linear prediction will be described using FIG. 15A. If the signal S2 is received at the time t1, a plurality of camera shake amounts u(m) that have been obtained immediately before receiving the signal S2 are linearly approximated, and the obtained line is extended while keeping the tilt thereof to predict the camera shake amount during the exposure. In FIG. 15A, the alternate long and dot dash line of the shake control input appears to be linear on the actual camera shake amount between the time t1 and the time t2 during the exposure. This is the linearly predicted value. Thereafter, upon the exposure being completed, the signal S0 is input at the time t2, and the switch 227 in FIG. 12 is switched and is grounded to the ground portion 228. Thereby, the image stabilization lens is moved to the reference position at which the center thereof coincides with the optical axis, and the angle of view of the object that is incident on the image sensor 6 changes, but the image that is being shot is not affected.

Here, considering the shake that has occurred during the exposure in FIG. 15A, the amount denoted by 263 in FIG. 15A is the magnitude of the remaining shake amount, and it can be understood that the influence of the shake is suppressed compared with the case of not performing shake prediction, which will be described using FIG. 15C. The shake that can be approximated by a line as described in FIG. 15A tends to occur when a standing human performs image shooting, for example. When standing, the body often swings to the left and right very slowly. This frequency (e.g., 0.1 Hz) is lower than the frequency of a camera shake that occurs due to a hand or an arm, and the magnitude of the swing is large. For this reason, considering a general exposure period (about ⅙₀s), the shake can be approximated by a line.

Next, the case of performing prediction using the adaptive filter will be described with reference to FIG. 15B. If the signal S2 is received at the time t1, the prediction value y(n+1) of the camera shake amount during the exposure is generated using the prediction signal generation unit 223. As described using FIG. 13, the recursive calculation is performed to generate the prediction value during the exposure, and the generated prediction value is used in the control. Almost correct prediction is performed with the simple waveform shown in FIG. 15B, and the shake prediction value roughly coincides with the actual shake in the period from the time t1 to the time t2 during the exposure as well. Thereafter, upon the exposure being completed, the signal S0 is input at the time t2, and the switch 227 in FIG. 12 is switched and is grounded to the ground portion 228. Thereby, the image stabilization lens is moved to the reference position, and the angle of view of the object that is incident on the image sensor 6 changes, but the image that is being shot is not affected.

Here, considering the shake that has occurred during the exposure in FIG. 15B, the amount denoted by 264 in FIG. 15B is the magnitude of the remaining shake amount, and it can be understood that the shake is better suppressed compared with the case of not performing the shake prediction, which will be described using FIG. 15C. In the case of using the adaptive filter, it is conceivable that the prediction signal generation unit 223 stores shake spectrum information in the form of the filter coefficients. For this reason, if appropriate information for updating the filter coefficients in the prediction signal generation unit 223 can be obtained, the accurate prediction is possible as shown in FIG. 15B. Note that although FIG. 15B shows the case of a simple waveform, the actual camera shake also need only be considered to be superposition of a plurality of simple waveforms, and accordingly, there are many situations where accurate prediction can be performed using the adaptive filter.

Next, a case of not performing the shake prediction during the exposure will be described with reference to FIG. 15C. If the signal S2 is received at the time t1, the image stabilization is stopped. In FIG. 15C, the image stabilization amount is zero in the period from the time t1 to the time t2. Of course the remaining shake amount after stabilization during the exposure is the actual camera shake amount itself. Here, considering the shake that has occurred during the exposure in FIG. 15C, the amount denoted by 265 in FIG. 15C is the magnitude of the remaining shake, and it can be understood that a large remaining shake is occurring.

As described above, according to the fifth embodiment, a system for performing prediction processing using the post-stabilization remaining shake signal can be established in the system for performing the image stabilization using the signal of the image sensor. As a result, improvement of picture quality can be achieved while providing a sequence appropriate for image shooting.

Note that although the above example has described the case of performing the image stabilization control by driving the image stabilization lens included in the imaging optical system 3, the image stabilization control can also be performed by driving the image sensor 6.

Sixth Embodiment

Next, a sixth embodiment of the present invention will be described. The fifth embodiment has described the image stabilization, whereas the sixth embodiment will describe a case of applying the prediction processing to focus adjustment. Note that since the basic configuration of the camera system is similar to that described in the fifth embodiment, a description thereof will be omitted. In the fifth embodiment, since the remaining shake after stabilization needs to be detected from the image signal obtained from the image sensor 6, the shake detection based on the optical flow detection is performed. Meanwhile, in the sixth embodiment, the focus state is detected from the image signal obtained from the image sensor 6. Note that the focus state is detected by the image processing unit 7.

FIGS. 16A to 16C are diagrams showing a configuration of the image sensor 6 according to the sixth embodiment. The image sensor 6 according to the sixth embodiment is configured such that a plurality of photoelectric conversion units are assigned to one microlens, and such microlenses are arranged in an array and constitute a microlens array 120.

FIG. 16A is a schematic view of the microlens array 120 in the image sensor 6 as viewed from the front and a side. As shown in FIG. 16A, the microlens array 120 is provided on the image sensor 6 so as to cover the image sensor 6 as viewed from the front, and the front principal point of the microlens array 120 is arranged near the image forming plane of the imaging optical system 3.

FIG. 16B is a schematic view showing correspondence of 2×2 microlenses in the microlens array 120 as viewed from the front to a plurality of photoelectric conversion units. Two photoelectric conversion units 121a and 121b are associated with each microlens 120a that constitutes the microlens array 120.

FIG. 16C is a diagram showing that the plurality of photoelectric conversion units 121a and 121b provided below the microlens 120a are associated with different regions of an exit pupil region of the imaging optical system 3 by the microlens 120a. FIG. 16C is a cross-sectional view of the image sensor 6 taken so as to include the optical axis of the microlens 120a, with the longitudinal direction of the sensor being the lateral direction of the diagram. Note that, in practice, if the direction of the photoelectric conversion units 121a and 121b shown in the lower part of FIG. 16C is aligned with the direction of the exit pupil plane, the exit pupil plane exits on a plane that is normal to the page of FIG. 16C, but the direction of the exit pupil plane is rotated so as to be shown on the plane of the page of FIG. 16C for the sake of the description.

As described in FIG. 16C, the photoelectric conversion units 121a and 121b are designed so as to be conjugate respectively to specific regions 131 and 132 on the exit pupil plane of the imaging optical system 3 through the microlens 120a. That is to say, a light beam that has passed through a partial region 131 of the exit pupil of the imaging optical system 3 is incident on the photoelectric conversion unit 121a. A light beam that has passed through a partial region 132 of the exit pupil of the imaging optical system 3 is incident on the photoelectric conversion unit 121b.

Thus, since the image sensor 6 according to the sixth embodiment can independently acquire an image signal corresponding to light beams that have passed through different regions of the exit pupil, a focus state can be detected based on the principle of so-called phase difference AF. Specifically, image signals obtained from the photoelectric conversion units 121a corresponding to the region 131, of the plurality of the photoelectric conversion units 121a and 121b provided below each microlens 120a, are collected to form one image. Similarly, the image signals obtained from the photoelectric conversion units 121b corresponding to the region 132 are collected to form another image. A focus state is detected based on the phase difference by performing known correlation calculation based on a pair of image signals that are thus obtained.

Then, in a state where the signal S1 is input, in a so-called servo AF mode of continuously performing AF control, a focus state is detected, and the detected focus state is added to the amount of movement of the focus lens detected by the position sensor 15. Processing can be performed similarly as with the camera shake amount described in the fifth embodiment, using the value (combined signal) that is thus obtained by addition.

Seventh Embodiment

Next, a seventh embodiment of the present invention will be described. The above fifth embodiment has described the method for performing the prediction after adding the shake detection signal to the amount of change of the angle of view that is based on the lens position signal obtained from the position sensor 15, whereas the seventh embodiment will describe a case of performing control based only on the shake detection signal.

Figure 17:
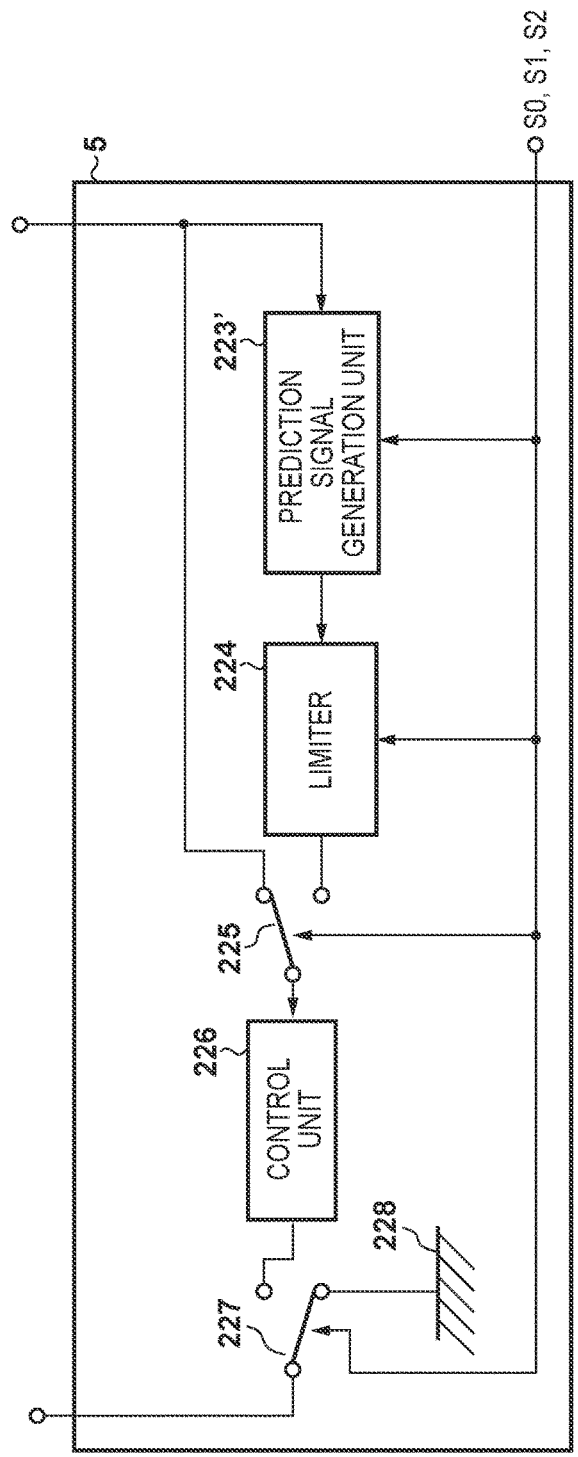
FIG. 17 is a block diagram showing a partial schematic configuration of a camera system control circuit according to a seventh embodiment.

FIG. 17 is a block diagram showing an exemplary configuration related to the image stabilization according to the seventh embodiment that is included in the camera system control circuit 5. A difference in the configuration between FIG. 17 and FIG. 12 lies in that the gain adjustment unit 230 for processing the lens position signal from the position sensor 15 and the adder 222 are not provided, and that the control of the prediction signal generation unit 223' using the reset signal is not performed. With this configuration, not the camera shake amount but the shake detection signal detected by the shake detection unit 70 is input to the prediction signal generation unit 223'. The other elements are similar to those shown in FIG. 12, and accordingly the same reference numerals will be assigned thereto and a description thereof will be omitted. Note that in the seventh embodiment, not the camera shake amount but the shake detection signal will be expressed as u(m).

As described in the fifth embodiment with reference to FIG. 14, the characteristics of the shake detection signal detected by the shake detection unit 70 before and after the start of the image stabilization greatly change. In the seventh embodiment, the prediction is performed based on the waveform of the remaining shake amount after stabilization denoted by the broken line in FIG. 14. Since the waveform of the remaining shake amount after stabilization can be obtained only by operating the image stabilization lens, in the seventh embodiment, the filter coefficients are updated while the signal S1 is input, as described later using FIG. 18.

Furthermore, in the seventh embodiment, lens control is performed based on the shake detection signal. This is a control method that is also called a so-called zero method or the like, where if the remaining shake occurs, the position of the image stabilization lens is adjusted so as to cancel the remaining shake. That is to say, if a shake occurs, this shake is detected by the shake detection unit 70, and stabilization is immediately performed (in a period that is roughly equal to a feedback control period).

Note that the switching of the switches 225 and 227 is performed similarly as in the fifth embodiment. Meanwhile, if the signal S0 is input, the image stabilization has stopped, and the filter coefficients are not updated in the prediction signal generation unit 223'. Thereafter, if the signal S1 is input, the image stabilization is performed based on the shake detection signal, and the filter coefficients are updated in the prediction signal generation unit 223'.

Figure 18:
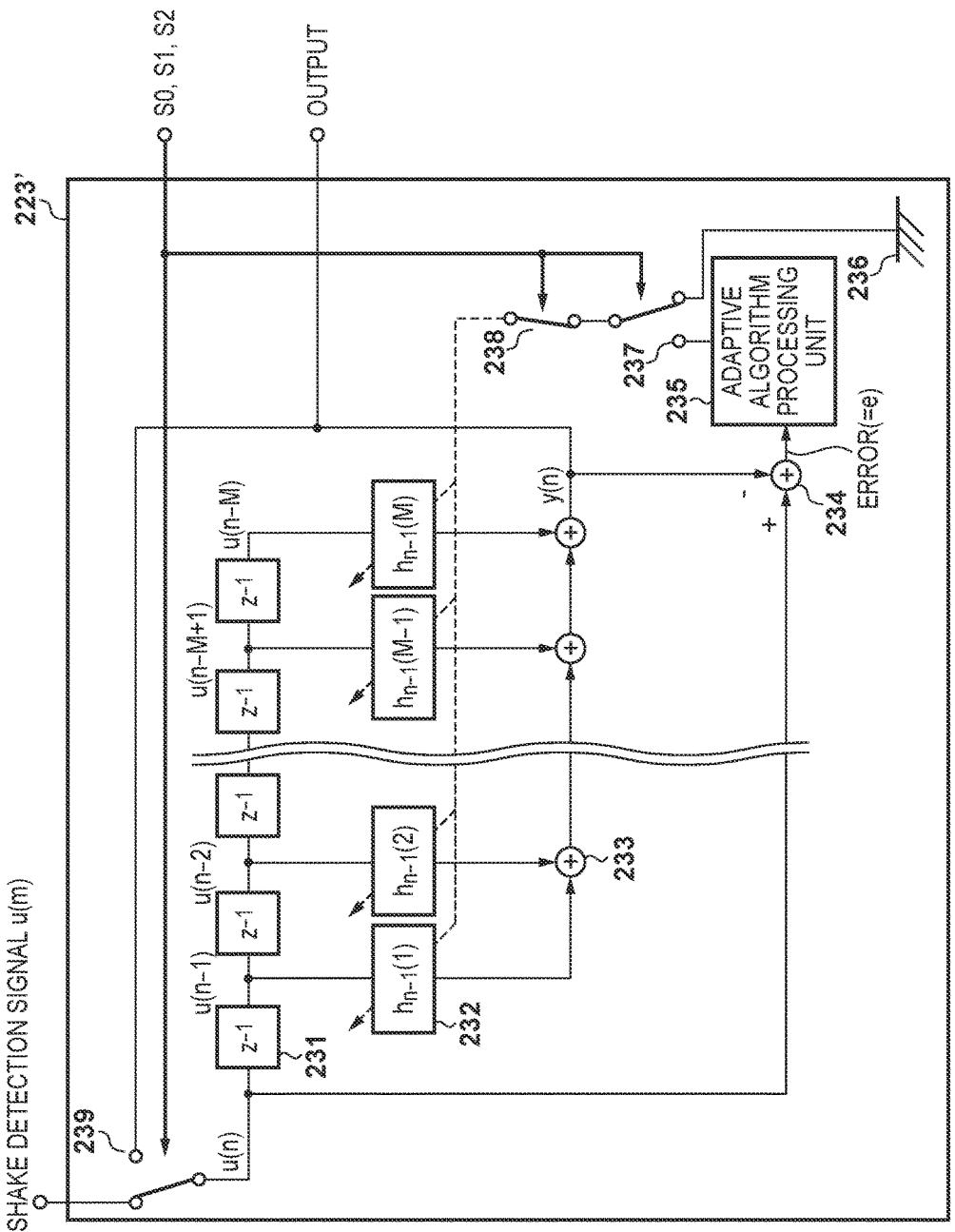
FIG. 18 is a block diagram showing a configuration of a prediction signal generation unit according to the seventh embodiment.

FIG. 18 is a diagram showing a configuration of the prediction signal generation unit 223' according to the seventh embodiment. A difference from the prediction signal generation unit 223 according to the fifth embodiment shown in FIG. 13 lies only in a timing signal for connection to the ground portion 236. In the fifth embodiment, the Reset signal is received and the filter coefficients are initialized. On the other hand, in the seventh embodiment, a correct signal is obtained after the signal S1 is input, and therefore, the filter coefficients are set to be in an initialized state before the signal S1 is input. Upon entering a state where the signal S1 is input, the switch 237 operates and is connected to the output from the adaptive algorithm processing unit 235, and the filter coefficients 232 are updated. This configuration enables the filter coefficients 232 to be updated based on the remaining shake amount after stabilization denoted by the broken line in FIG. 14. Furthermore, if the signal S2 is input, the image stabilization lens is controlled based on the prediction value y(n+1) that is computed using the filter coefficients 232 and is output from the prediction signal generation unit 223'.

Figure 19A:
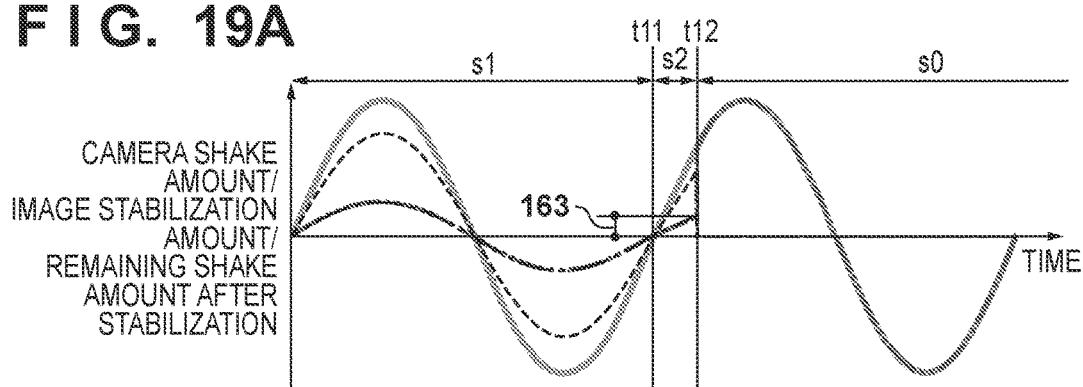
FIGS. 19A to 19C are diagrams illustrating a remaining shake amount after stabilization at the time of still image shooting according to the seventh embodiment.
Figure 19B:
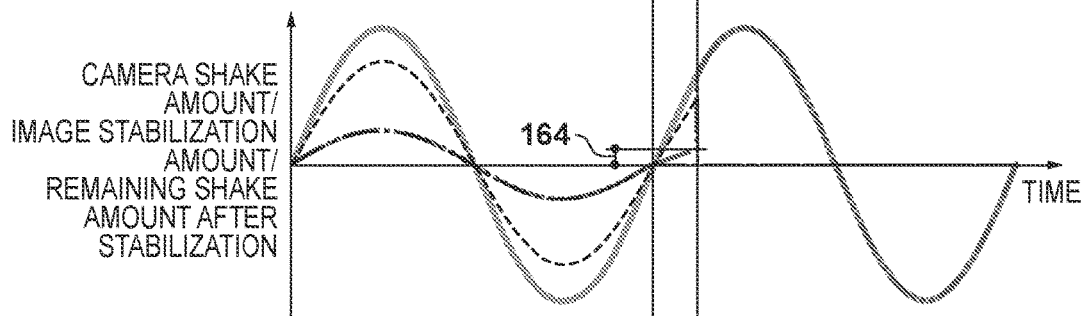
Figure 19C:
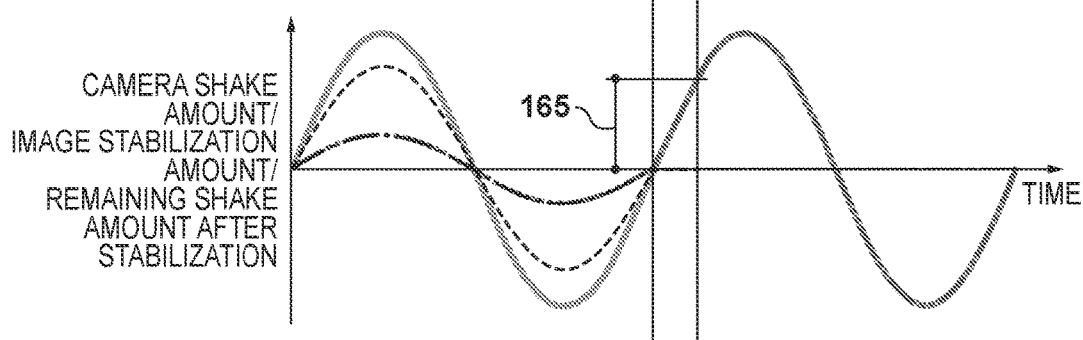

FIGS. 19A to 19C are diagrams for illustrating the camera shake amount and the remaining shake amount after stabilization in the case of performing the prediction processing and in the case of not performing the prediction processing. In order to facilitate understanding of the description, it is assumed also in FIGS. 19A to 19C that the actual shake applied to the camera system is a simple sine wave. Furthermore, similarly to FIGS. 15A to 15C, it is assumed here that the signal S0, the signal S1, and the signal S2 are switched by an operation made on a shutter button (not shown) when shooting a still image. Specifically, the signal S0 is output in a state where the shutter button is not pressed, the signal S1 is output in a state where the shutter button is half-pressed and an instruction to prepare for shooting has been given, and the signal S2 is output in a state where the shutter button is full-pressed and an instruction to recording an image has been given.

FIG. 19A is a graph showing the case of performing the linear prediction using a plurality of signals obtained immediately before the prediction, FIG. 19B is a graph showing the case of performing the shake prediction using the adaptive filter shown in FIG. 18, and FIG. 19C is a graph showing the case of not performing the shake prediction. Note that, in FIGS. 19A to 19C, the horizontal axis indicates the time, and the vertical axis indicates the actual camera shake amount, the detected camera shake amount, the image stabilization amount, or the remaining shake amount after stabilization. Note that FIG. 19C is similar to FIG. 15C, and therefore, a description thereof will be omitted here.

Time t11 is the timing of receiving the signal S2 (e.g., the timing of starting exposure), and at the time before the time t11, the image stabilization processing is being performed, i.e., the signal S1 is output. At the time after time t12 after the exposure, the image stabilization processing is not performed, i.e., the signal S0 is output. The period from the time t11 to the time t12 in which the signal S2 is output is the time in which the exposure is being performed, and the shake detection signal based on the image signal output from the image sensor 6 cannot be obtained. For this reason, in this period, the image stabilization control based on the prediction value is performed. In FIGS. 19A to 19C, 163, 164, and 165 denote the magnitudes of the remaining shake amount after stabilization in the case of the respective methods.

In FIGS. 19A to 19C, thick solid lines denote the actual camera shake amount applied to the camera system, and alternate long and short dash lines denote the shake detection signal, or the prediction value y(m) that is output by the prediction signal generation unit 223' during the exposure. Broken lines denote the image stabilization amount, and alternate long and two short dashes lines denote the remaining shake amount after stabilization. Control is performed using a so-called zero method in which appropriate phase compensation and gain compensation are performed on the shake detection signal to drive the image stabilization lens. The amount of the stabilization performed by the image stabilization lens is a response to shake control input regarding which mechanical following characteristics and the like are considered, and corresponds to the image stabilization amount achieved via the control unit 226 in FIG. 17. The shake detection signal, which is the remaining shake after stabilization, indicates the difference between the actual camera shake amount and the amount of the stabilization performed by the image stabilization lens. If the remaining shake after stabilization during the exposure is small, the actual shake can be considered to be small.

A case of performing the linear prediction will be described using FIG. 19A. If the signal S2 is received at the time t11, a plurality of shake detection signals u(m) that have been obtained immediately before receiving the signal S2 are linearly approximated, and the obtained line is extended while keeping the tilt thereof to predict the shake detection signal during the exposure. In FIG. 19A, the alternate long and short dash line indicating the prediction value of the shake detection signal appears to be linear and slightly deviate from the line indicating the actual camera shake amount in the period from the time t11 to the time t12 during the exposure. This is the linearly predicted value. Considering the shake that has occurred during the exposure in FIG. 19A, the amount denoted by 163 in FIG. 19A is the magnitude of the shake, and it can be understood that the influence of the shake is suppressed compared with the case of not performing the shake prediction shown in FIG. 19C.

Next, the case of performing the prediction using the adaptive filter will be described with reference to FIG. 19B. If the signal S2 is received at the time t11, the prediction value y(n+1) of the shake detection signal during the exposure is generated using the prediction signal generation unit 223'. In the example in FIGS. 19A to 19C, similarly as in the case of linear prediction, the alternate long and short dash line of the shake control input appears to be linear so as to be slightly deviate from the line of the remaining shake after stabilization in the period from the time t11 to the time t12 during the exposure. Considering the shake that has occurred during the exposure in FIG. 19B, the amount denoted by 164 in FIG. 19B is the magnitude of the shake, and it can be understood that the influence of the shake is suppressed compared with the case of not performing the shake prediction shown in FIG. 19C.

As described above, according to the seventh embodiment, a system for performing prediction processing using the post-stabilization remaining shake signal can be established in the system for performing the image stabilization using the signal of the image sensor. As a result, improvement of picture quality can be achieved while providing a sequence appropriate for shooting.

Note that, although the above embodiments have described the cases of applying the present invention to the camera system constituted by the camera body 1' and the lens unit 2', it is needless to say that the invention is also applicable to an image capturing apparatus in which a camera body and a lens unit are integrally configured.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-116022 and 2015-116024, both filed on Jun. 8, 2015 which are hereby incorporated by reference herein in their entirety.

What is claimed is:

1. An image processing apparatus comprising:
a processor and a memory storing therein program instructions which, when executed, cause the processor to operate as following units:
a detection unit that detects moving information using a plurality of images output from an image sensor;
a prediction unit that predicts moving information corresponding to a first image that is captured after a first image group based on moving information detected using a plurality of images included in the first image group; and
a calculation unit that calculates a coefficient to be used in prediction processing by the prediction unit,
wherein the calculation unit calculates a coefficient to be used in the prediction processing for predicting moving information corresponding to a second image captured after the first image using the moving information corresponding to the first image that is predetected by the prediction unit and moving information corresponding to the first image detected by the detection unit.

2. The image processing apparatus according to claim 1, wherein the prediction unit predicts the moving information corresponding to the second image using moving information detected using a plurality of images included in a second image group that includes the first image and the coefficient for the second image calculated by the calculation unit.

3. The image processing apparatus according to claim 1, wherein the detection unit detects moving information of a main object.

4. The image processing apparatus according to claim 1, wherein the prediction unit perform the prediction processing during live view display or moving image shooting.

5. An image capturing apparatus comprising:
a processor and a memory storing therein program instructions which, when executed, cause the processor to operate as following units:
a detection unit that detects moving information using a plurality of images output from an image sensor;
a prediction unit that predicts moving information corresponding to a first image that is captured after a first image group based on moving information detected using a plurality of images included in the first image group;
a calculation unit that calculates a coefficient to be used in prediction processing by the prediction unit; and
a driving unit that drives a correction lens or the image sensor based on the moving information predicted by the prediction unit,
wherein the calculation unit calculates a coefficient to be used in the prediction processing for predicting moving information corresponding to a second image captured after the first image using the moving information corresponding to the first image that is predetected by the prediction unit and moving information corresponding to the first image detected by the detection unit.

6. An image processing method comprising:
detecting moving information using a plurality of images included in a first image group output from an image sensor;
calculating a coefficient to be used in prediction processing;
performing the prediction processing for predicting moving information corresponding to a first image that is captured after the first image group based on the detected moving information;
detecting moving information corresponding to the first image; and
calculating a coefficient to be used in prediction processing for predicting moving information corresponding to a second image captured after the first image using the predicted moving information corresponding to the first image and the detected moving information corresponding to the first image.

* * * * *